US012145362B2

(12) United States Patent
Nakano et al.

(10) Patent No.: US 12,145,362 B2
(45) Date of Patent: Nov. 19, 2024

(54) INKJET PRINTING APPARATUS AND CONTROLLING METHOD

(71) Applicant: CANON KABUSHIKI KAISHA, Tokyo (JP)

(72) Inventors: Takatoshi Nakano, Kanagawa (JP); Takuya Fukasawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 17/933,225

(22) Filed: Sep. 19, 2022

(65) Prior Publication Data

US 2023/0013083 A1 Jan. 19, 2023

Related U.S. Application Data

(63) Continuation of application No. 17/078,719, filed on Oct. 23, 2020, now Pat. No. 11,472,179.

(30) Foreign Application Priority Data

Oct. 31, 2019 (JP) ................................ 2019-199389

(51) Int. Cl.
*B41J 2/045* (2006.01)
*B41J 2/14* (2006.01)

(52) U.S. Cl.
CPC ....... *B41J 2/04581* (2013.01); *B41J 2/14201* (2013.01)

(58) Field of Classification Search
CPC .... B41J 2/04581; B41J 2/14201; B41J 29/02; B41J 2002/14354; B41J 2002/16573; B41J 2/0451; B41J 2/04571; B41J 2/16508; B41J 2/16585; B41J 2/16588; B41J 2/18;

(Continued)

(56) References Cited

FOREIGN PATENT DOCUMENTS

| | | | | |
|---|---|---|---|---|
| JP | 2015174424 A | * | 10/2015 | .... B41J 2002/14354 |
| JP | 2016101726 A | | 6/2016 | |
| JP | 2017177423 A | | 10/2017 | |

(Continued)

OTHER PUBLICATIONS

Okita Kenji et al., Liquid Discharge Device and Circulation Flow Rate Adjustment Method (JP 2015174424 A), See "Embodiment", Oct. 5, 2015 (Year: 2015).*

*Primary Examiner* — Lisa Solomon
(74) *Attorney, Agent, or Firm* — Canon U.S.A., Inc. IP Division

(57) ABSTRACT

An inkjet printing apparatus includes a printing unit having ejection parts, each configured to eject ink by using a piezoelectric element to be displaced in response to a change in electric potential. The inkjet printing apparatus also includes a circulation unit, a determination unit, and a control unit. The circulation unit executes ink circulation in a circulation path inclusive of the printing unit. The determination unit ejects the ink from each ejection part, detects residual vibration generated at an ejection part due to ink ejection, and determines an ejection state of ink ejection at the ejection part based on the detected residual vibration. The inkjet printing apparatus determines a printing state of ink ejection in the printing unit based on the ejection state. The control unit causes the determination unit not to make the ejection state determination in parallel with causing the circulation unit to execute the ink circulation.

28 Claims, 19 Drawing Sheets

(58) Field of Classification Search
CPC .... B41J 2002/14419; B41J 2002/14491; B41J 2202/11; B41J 2/14233; B41J 2202/12
See application file for complete search history.

(56) References Cited

FOREIGN PATENT DOCUMENTS

| | | | |
|---|---|---|---|
| JP | 2017177568 | A | 10/2017 |
| JP | 2019166731 | A | 10/2019 |

* cited by examiner

| Info-S | Info-T (CONTENTS OF NTc COMPARISON) | Stt |
|---|---|---|
| 1 | NTc < Tth1 | 2 : EJECTION ABNORMALITY (BUBBLES) |
| | Tth1 ≦ NTc ≦ Tth2 | 1 : FINE (NORMAL) |
| | Tth2 < NTc ≦ Tth3 | 3 : EJECTION ABNORMALITY (FOREIGN MATTERS) |
| | Tth3 < Ntc | 4 : EJECTION ABNORMALITY (INCREASE IN VISCOSITY) |
| 0 | N/A | 5 : EJECTION ABNORMALITY |

FIG.11

| | THRESHOLDS FOR RESPECTIVE INK COLORS (NUMBERS OF EJECTION PARTS HAVING EJECTION ABNORMALITY) |
|---|---|
| K1 | 70 |
| K2 | 70 |
| C | 100 |
| M | 100 |
| Y | 150 |
| TOTAL | 300 |

FIG.14A

| | THRESHOLDS FOR RESPECTIVE INK COLORS (RATIOS OF EJECTION PARTS HAVING EJECTION ABNORMALITY) |
|---|---|
| K1 | 0.09 % |
| K2 | 0.09 % |
| C | 0.13 % |
| M | 0.13 % |
| Y | 0.20 % |
| TOTAL | 0.39 % |

FIG.14B

THRESHOLDS FOR RESPECTIVE CHIPS

| CHIP CODES | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| THRESHOLDS | 40 | 40 | 40 | 35 | 35 | 35 | 30 | 30 | 30 | 35 | 35 | 35 | 40 | 40 | 40 |

FIG.15A

THRESHOLDS FOR RESPECTIVE CHIPS (DEPENDING ON INK COLORS)

| CHIP CODES | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| K1 | 9 | 9 | 9 | 7 | 7 | 7 | 5 | 5 | 5 | 7 | 7 | 7 | 9 | 9 | 9 |
| K2 | 9 | 9 | 9 | 7 | 7 | 7 | 5 | 5 | 5 | 7 | 7 | 7 | 9 | 9 | 9 |
| C | 10 | 10 | 10 | 10 | 10 | 10 | 10 | 10 | 10 | 10 | 10 | 10 | 10 | 10 | 10 |
| M | 10 | 10 | 10 | 10 | 10 | 10 | 10 | 10 | 10 | 10 | 10 | 10 | 10 | 10 | 10 |
| Y | 15 | 15 | 15 | 15 | 15 | 15 | 15 | 15 | 15 | 15 | 15 | 15 | 15 | 15 | 15 |

FIG.15B

| EJECTION PART CODES | RESULT OF DETERMINATION 0 | 1 | 2 | 3 | 4 | 5 | 6 | 7 | 8 | 9 | NUMBERS OF EJECTION PARTS TARGETED FOR DETERMINATION | NUMBERS OF EJECTION PARTS HAVING EJECTION ABNORMALITY | RATIOS OF EJECTION PARTS HAVING EJECTION ABNORMALITY | THRESHOLDS | DETERMINATION RESULT |
|---|---|---|---|---|---|---|---|---|---|---|---|---|---|---|---|
| K1 | ○ | ○ | ◍× | ○ | ○ | ○ | ○× | ○ | ○ | ○ | 9 | 1 | 11 % | 15 % | OK |
| K2 | ○ | ○ | ○ | ○ | ◍ | ○ | ○ | ○ | ○× | ○× | 9 | 2 | 22 % | 15 % | NG |
| C | ○ | ○ | ○ | ○ | ○ | ○ | ○ | ○ | ○ | ○ | 10 | 0 | 0 % | 15 % | OK |
| M | ○ | ◍× | ○ | ○ | ○ | ○ | ○ | ◍× | ○ | ○ | 8 | 0 | 0 % | 15 % | OK |
| Y | ○ | ○ | ○ | ○ | ○× | ◍× | ○ | ○ | ○ | ○ | 9 | 1 | 11 % | 15 % | OK |

◍ ABNORMALITY DETERMINED EJECTION PARTS

× EJECTION PARTS DETERMINED TO HAVE EJECTION ABNORMALITY

FIG.16

| NUMBERS OF EJECTION PARTS DETERMINED TO HAVE EJECTION ABNORMALITY (m) | RECOVERY OPERATIONS |
|---|---|
| $0 \leqq m < 10$ | DETERMINATION PROCESSING ONCE |
| $10 \leqq m < 30$ | DETERMINATION PROCESSING THREE TIMES |
| $30 \leqq m < 50$ | DETERMINATION PROCESSING FIVE TIMES |
| $50 \leqq m < 100$ | INK CIRCULATION 5 SECONDS |
| $100 \leqq m < 200$ | INK CIRCULATION 10 SECONDS |
| $200 \leqq m < 500$ | INK CIRCULATION 25 SECONDS |
| $500 \leqq m < 1000$ | INK CIRCULATION 50 SECONDS |
| $1000 \leqq m$ | WIPING |

FIG.19

INKJET PRINTING APPARATUS AND CONTROLLING METHOD

CROSS-REFERENCE TO RELATED APPLICATIONS

The present application is a continuation of U.S. patent application Ser. No. 17/078,719, filed on Oct. 23, 2020, which claims priority from Japanese Patent Application No. 2019-199389 filed Oct. 31, 2019, which are hereby incorporated by reference herein in their entireties.

BACKGROUND

Field

The present disclosure relates to an inkjet printing apparatus that executes a recovery operation to successfully maintain and recover a state of ejection of an ink from a print head, and a controlling method of controlling the inkjet printing apparatus.

Description of the Related Art

Japanese Patent Laid-Open No. 2017-114049 discloses a technique to determine ejection abnormality at a liquid ejection head in an inkjet printing apparatus designed to eject a liquid from an ejection part by displacing a piezoelectric element. To be more precise, according to the technique disclosed in Japanese Patent Laid-Open No. 2017-114049, a state of ejection of the liquid at the ejection part is detected based on a residual signal generated at the ejection part after ejection of the liquid by driving the piezoelectric element, and to determine ejection abnormality at the liquid ejection head based on a result of the detection. Meanwhile, Japanese Patent Laid-Open No. 2017-121784 discloses an inkjet printing apparatus including a structure to circulate an ink between a print head and a tank.

However, according to the inkjet printing apparatus provided with the structure to circulate the ink as disclosed in Japanese Patent Laid-Open No. 2017-121784, a circulatory flow occurs in the vicinity of an ejection opening due to a circulating operation in a case where the ejection abnormality is detected by using the technique according to Japanese Patent Laid-Open No. 2017-114049, thus potentially causing a variation in detection accuracy of residual vibration. As a consequence, it is not possible to accurately determine the ejection abnormality at the ejection part.

SUMMARY

The present disclosure conveys a technique applicable to an inkjet printing apparatus having a structure to circulate an ink, which is capable of accurately determining ejection abnormality at an ejection part.

According to an aspect of the present disclosure, an inkjet printing apparatus includes a printing unit including a plurality of ejection parts, each configured to eject an ink by using a piezoelectric element to be displaced in response to a change in electric potential, a circulation unit configured to execute circulation of the ink in a circulation path inclusive of the printing unit, a determination unit configured to eject the ink from each ejection part, to detect residual vibration generated at an ejection part due to ejection of the ink, and to determine an ejection state of ejection of the ink at the ejection part based on the detected residual vibration, wherein the inkjet printing apparatus is configured to determine a printing state of ejection of the ink in the printing unit based on the ejection state, and, a control unit configured to cause the determination unit not to make the ejection state determination in parallel with causing the circulation unit to execute the circulation of the ink.

The present disclosure allows for an inkjet printing apparatus having a structure to circulate an ink to accurately determine ejection abnormality at an ejection part. There is provided a technique applicable to an inkjet printing apparatus having a structure to circulate an ink, which is capable of accurately determining ejection abnormality at an ejection part. The inkjet printing apparatus does not allow execution of circulation of an ink and determination of ejection abnormality at an ejection part in parallel.

Further features of the present disclosure will become apparent from the following description of exemplary embodiments with reference to the attached drawings.

BRIEF DESCRIPTION I/F THE DRAWINGS

Figure 4A:
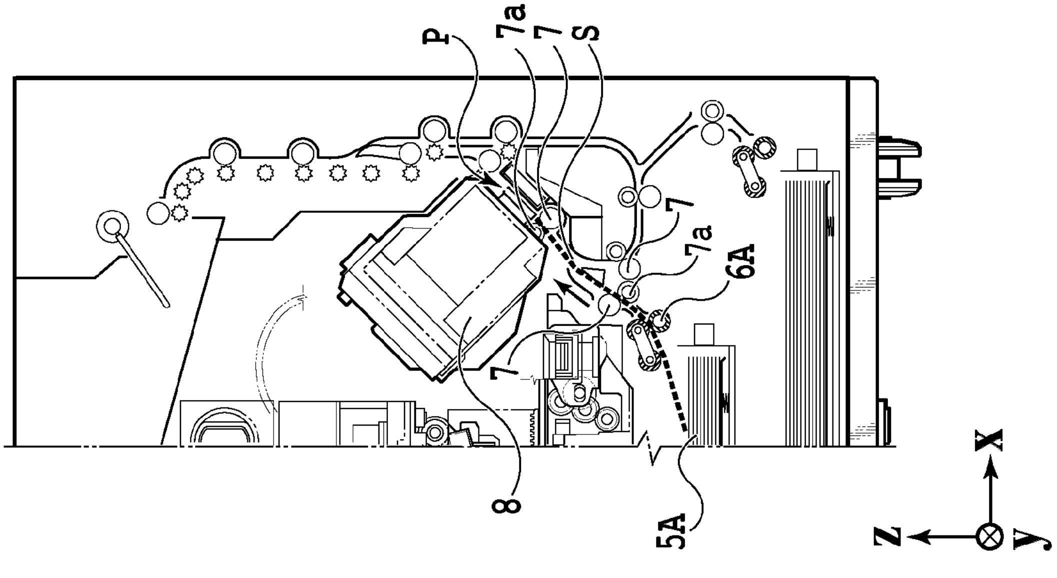
Figure 4B:
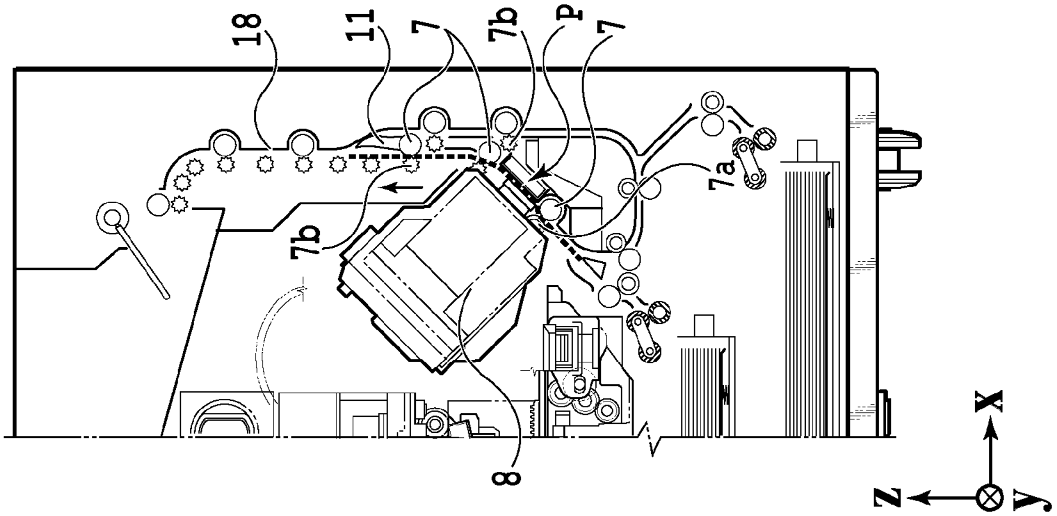
Figure 4C:
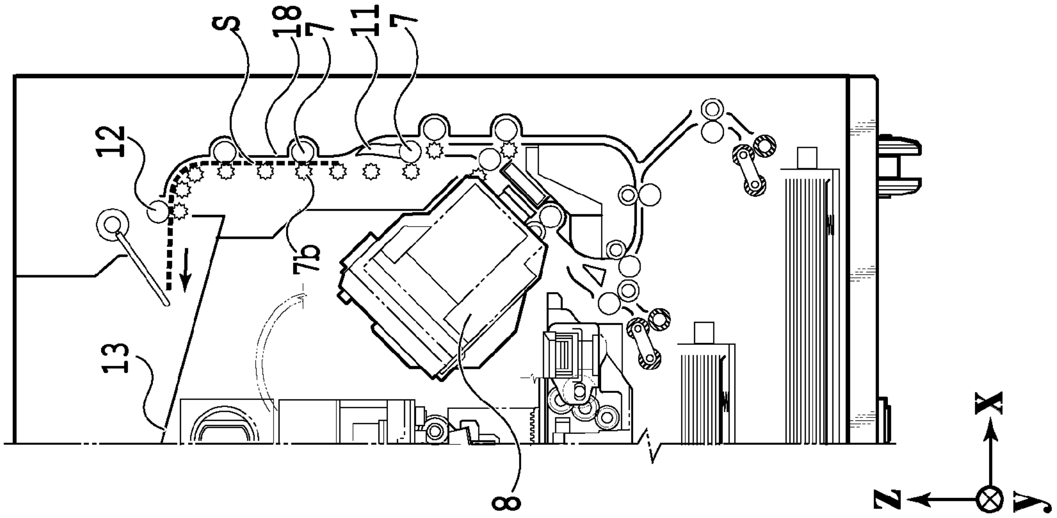
Figure 5:
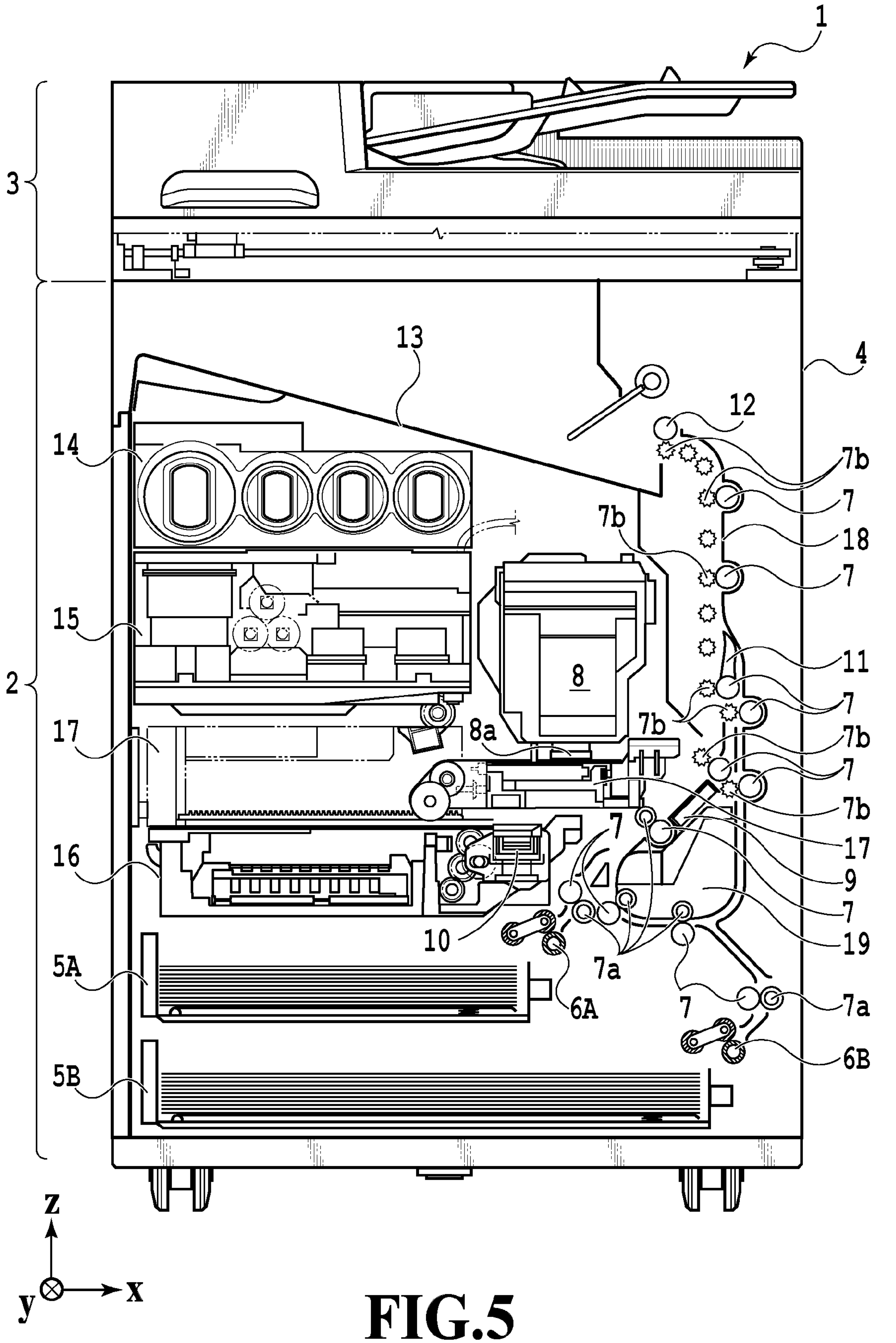
Figure 6A:
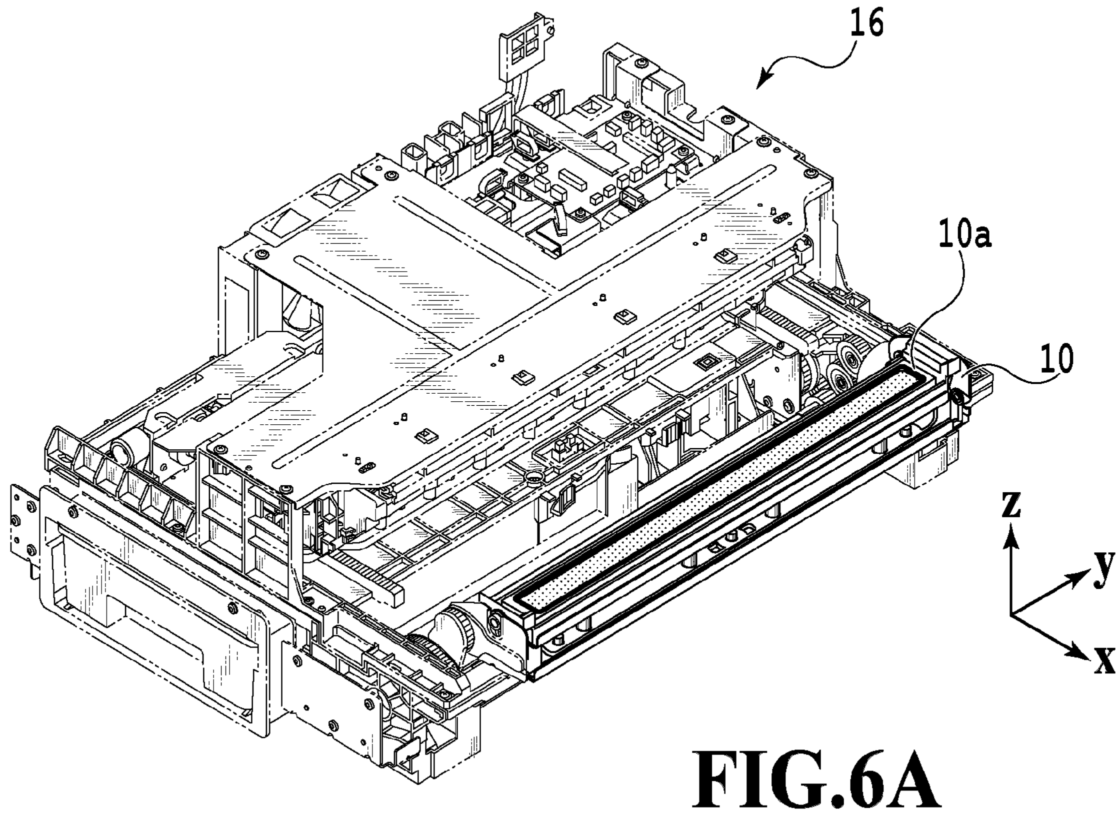
Figure 6B:
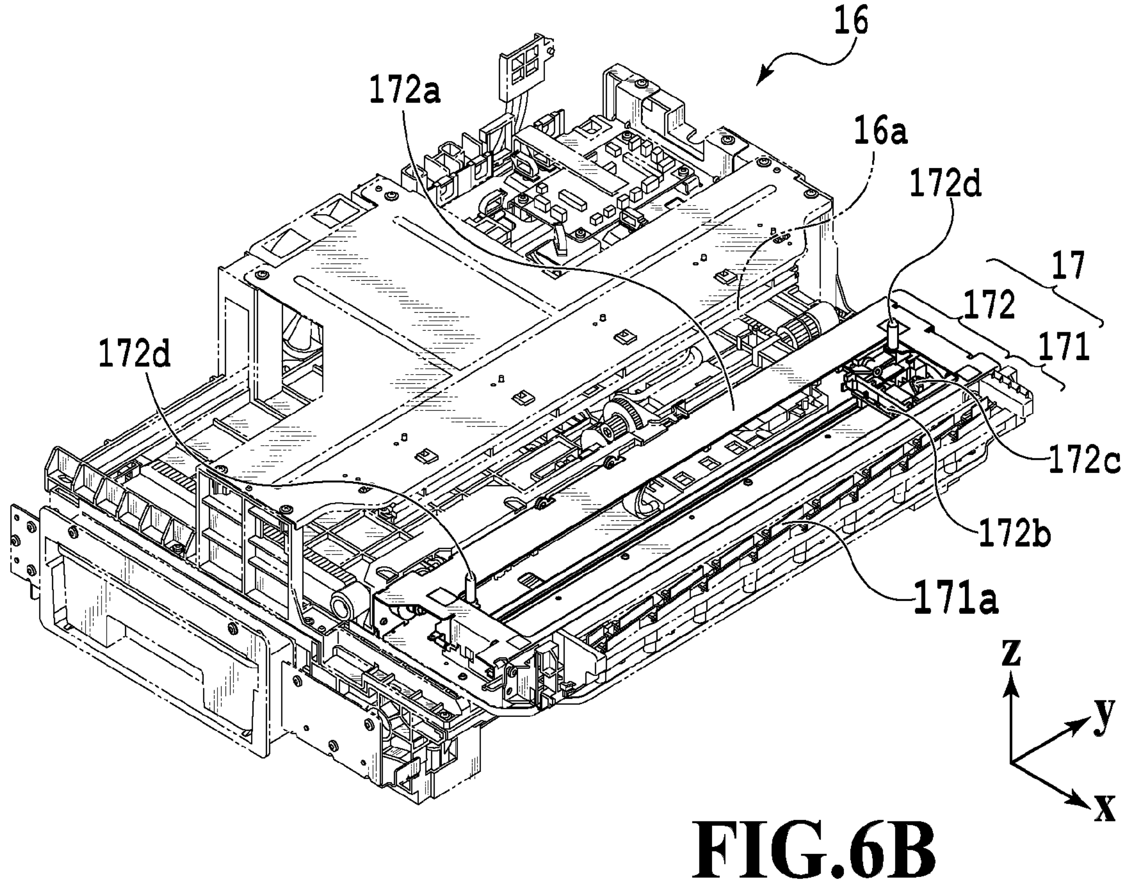
Figure 7:
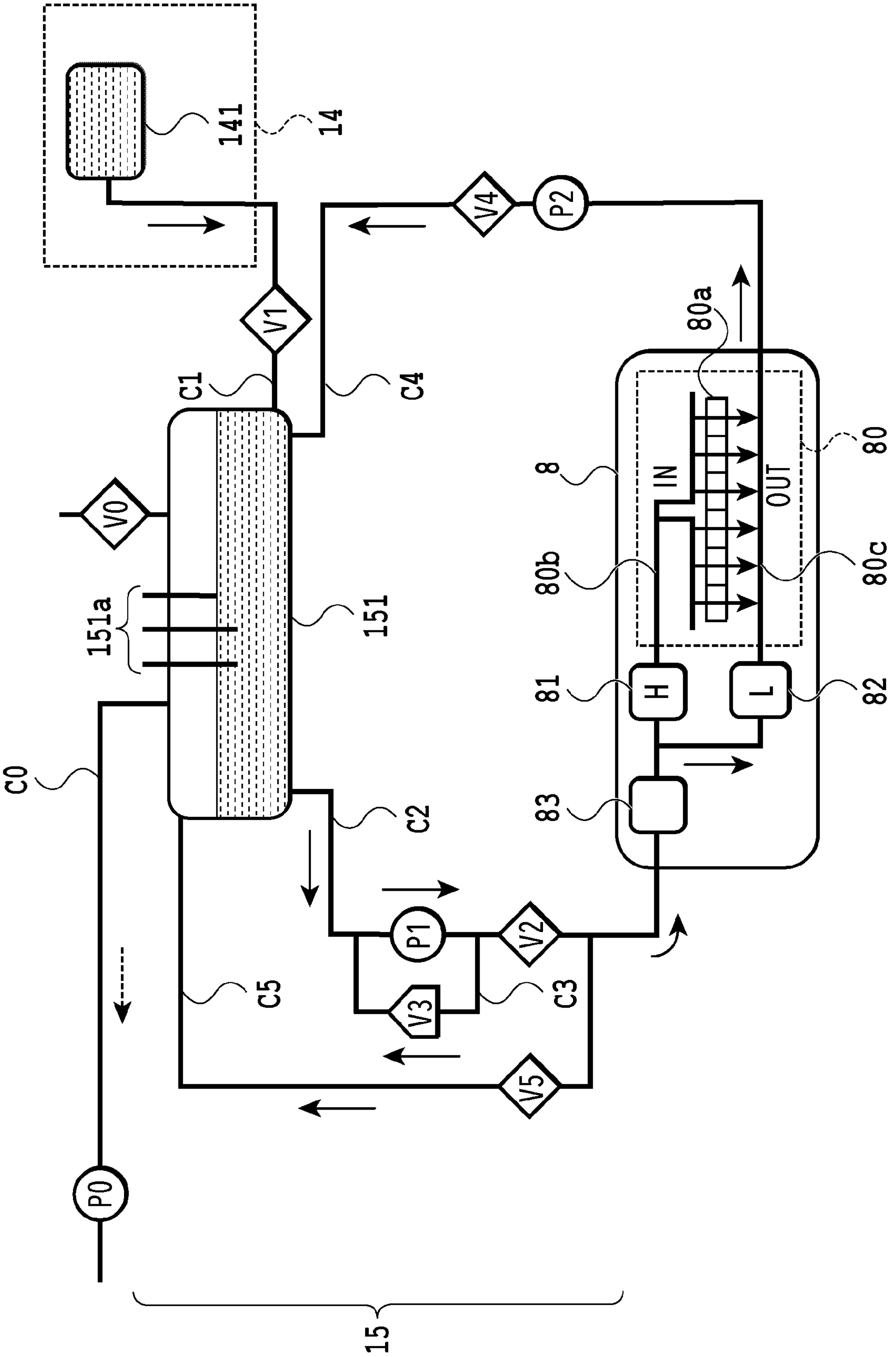
Figure 8A:
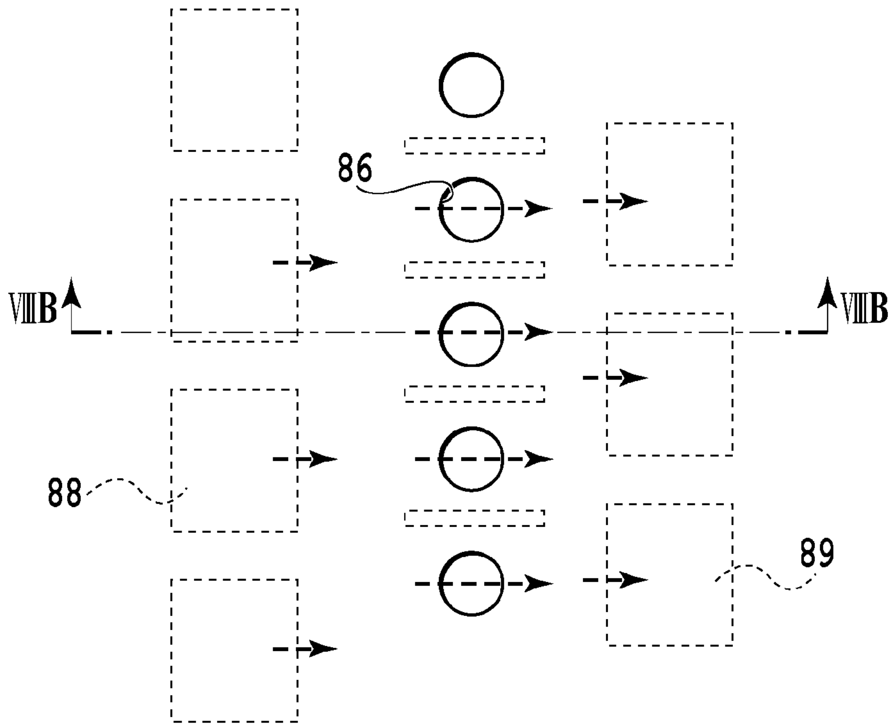
Figure 8B:
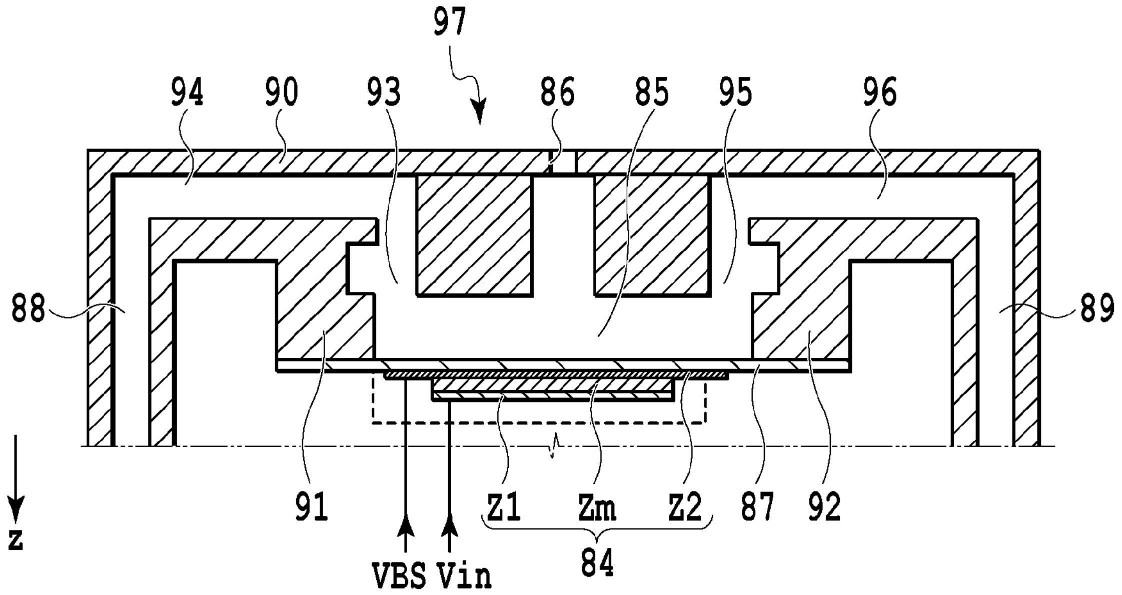
Figure 9C:
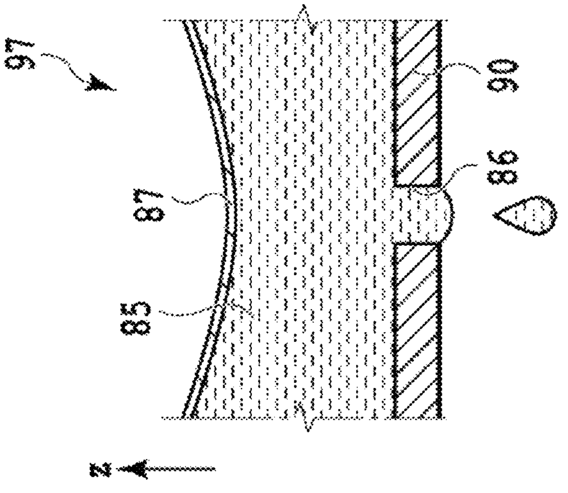
Figure 9B:
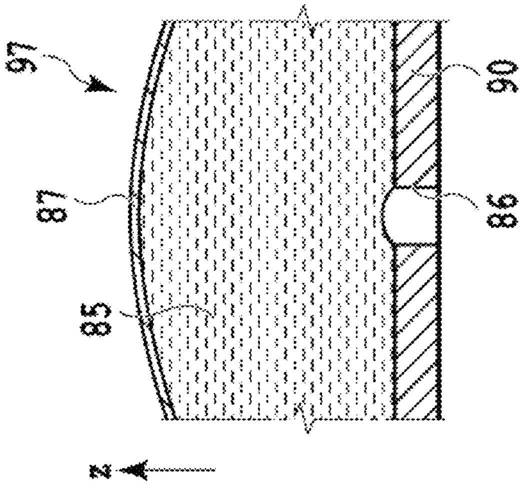
Figure 9A:
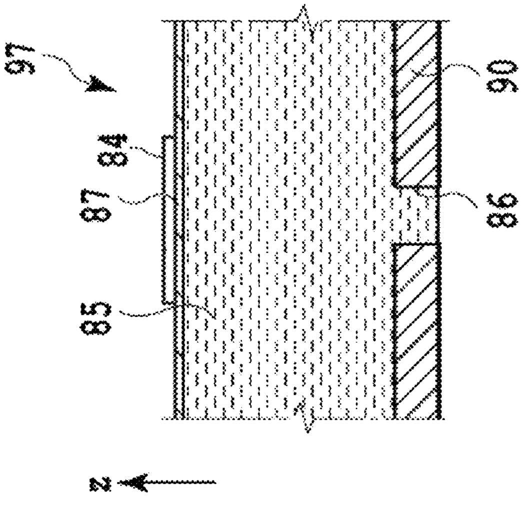
Figure 10:
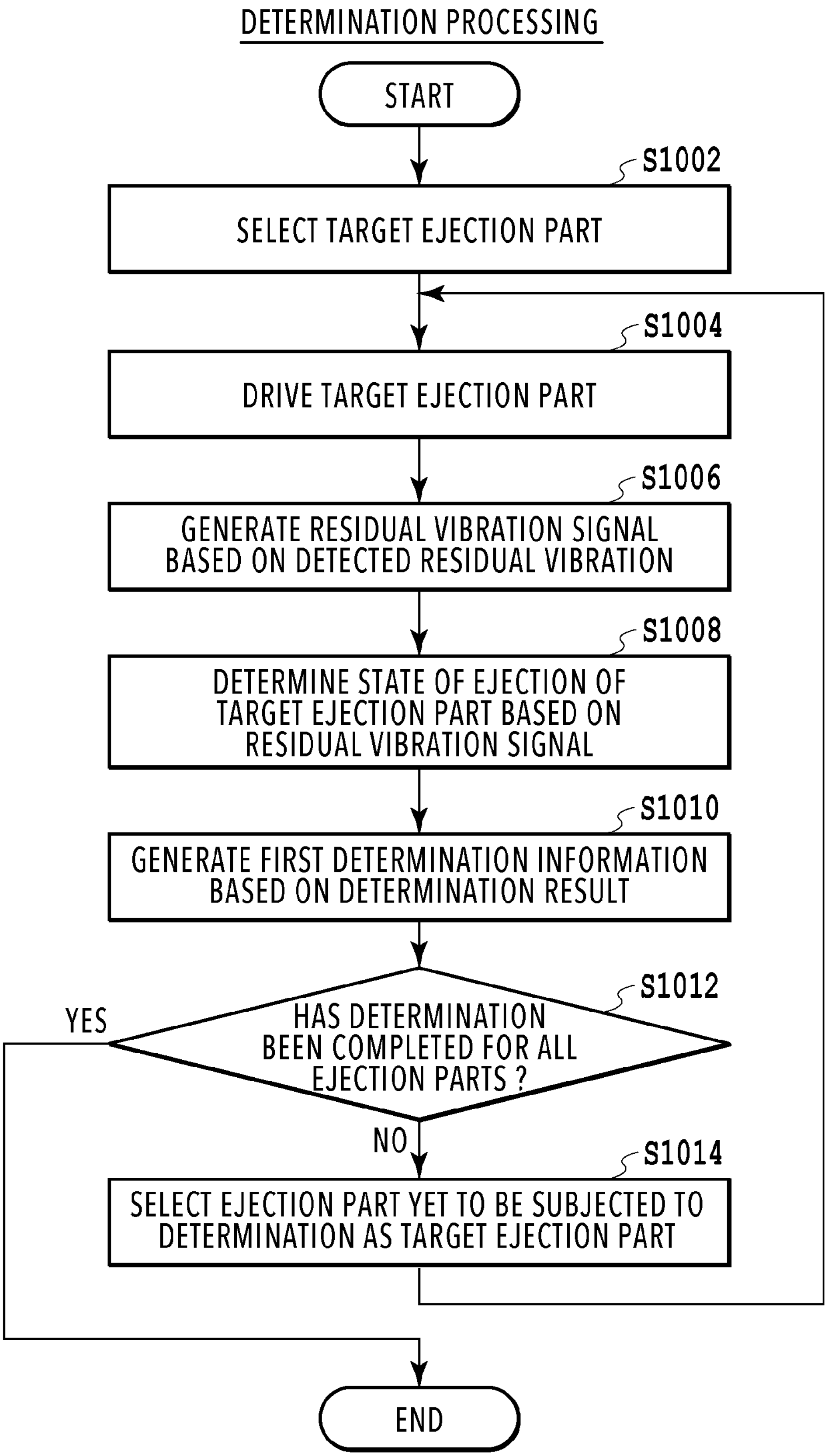
Figure 12A:
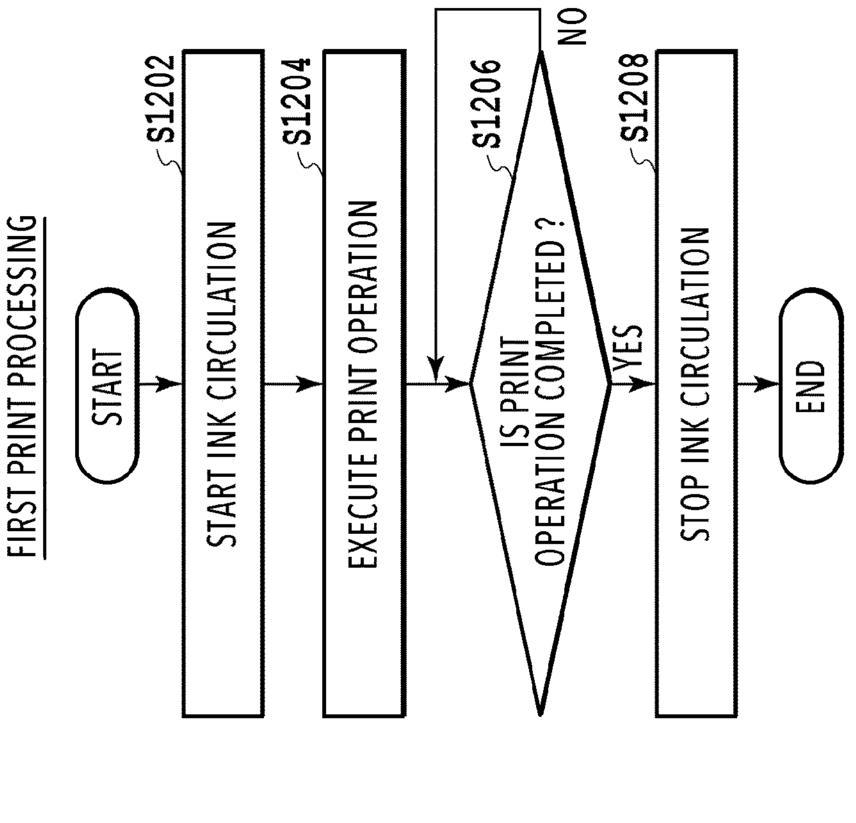
Figure 12B:
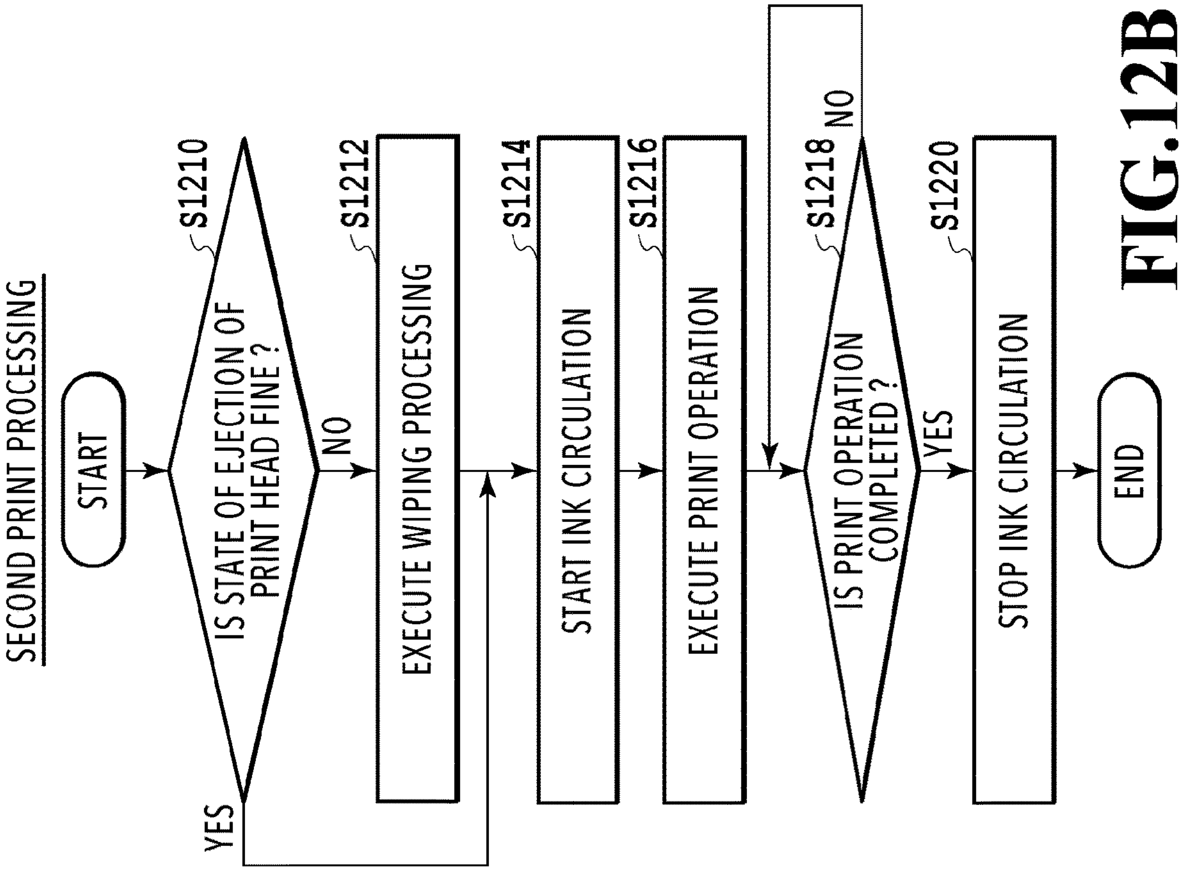
Figure 13:
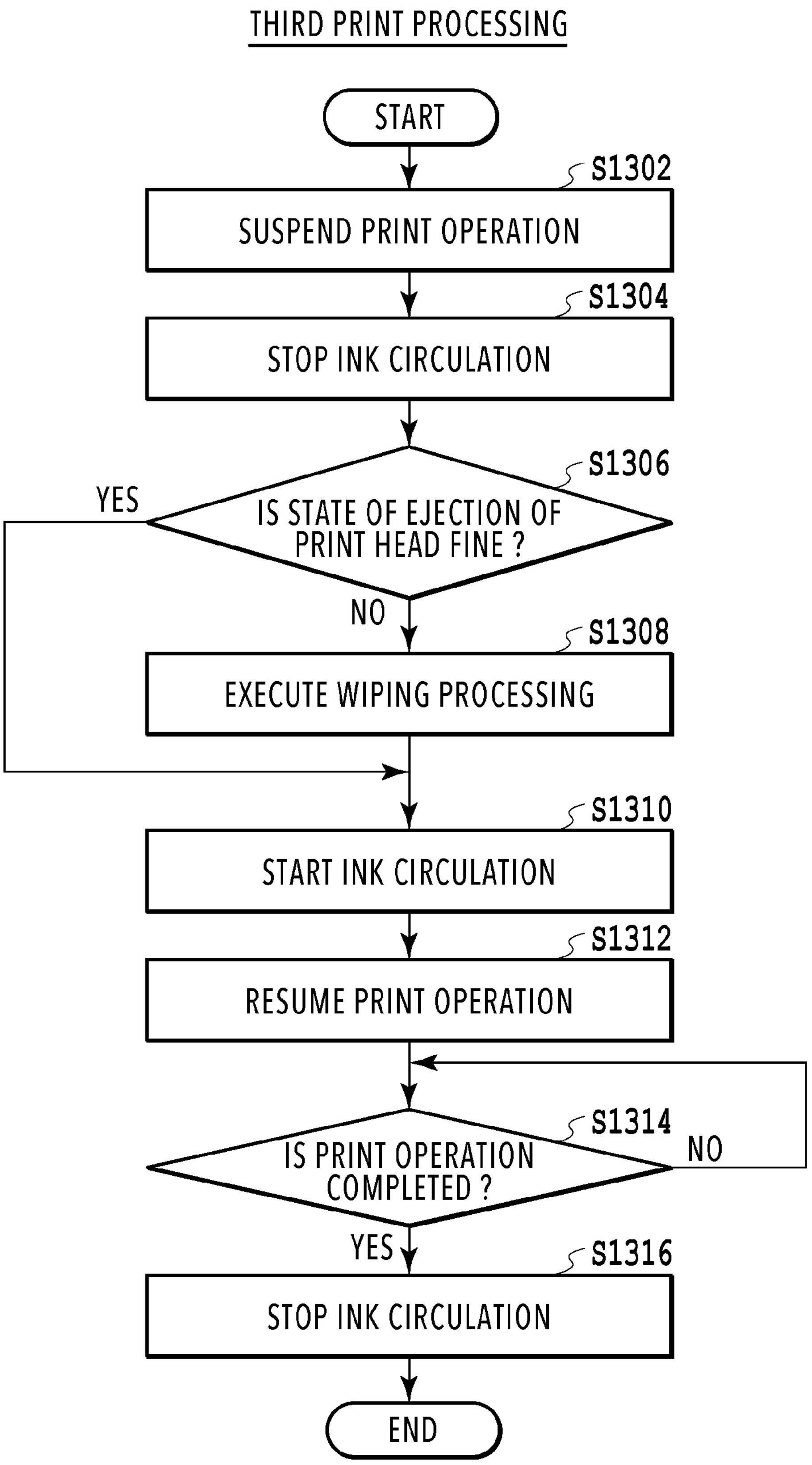
Figure 17:
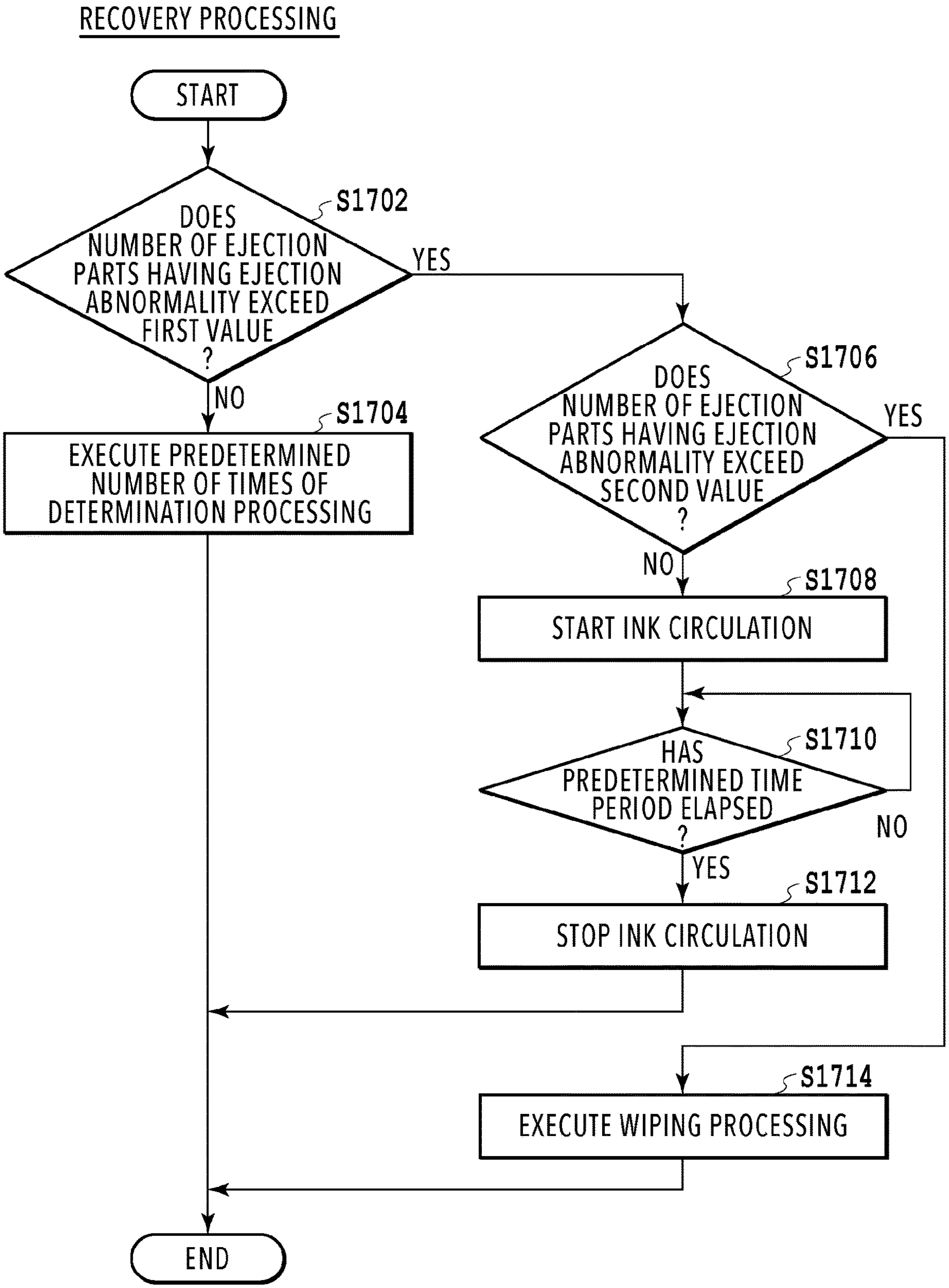
Figure 18:
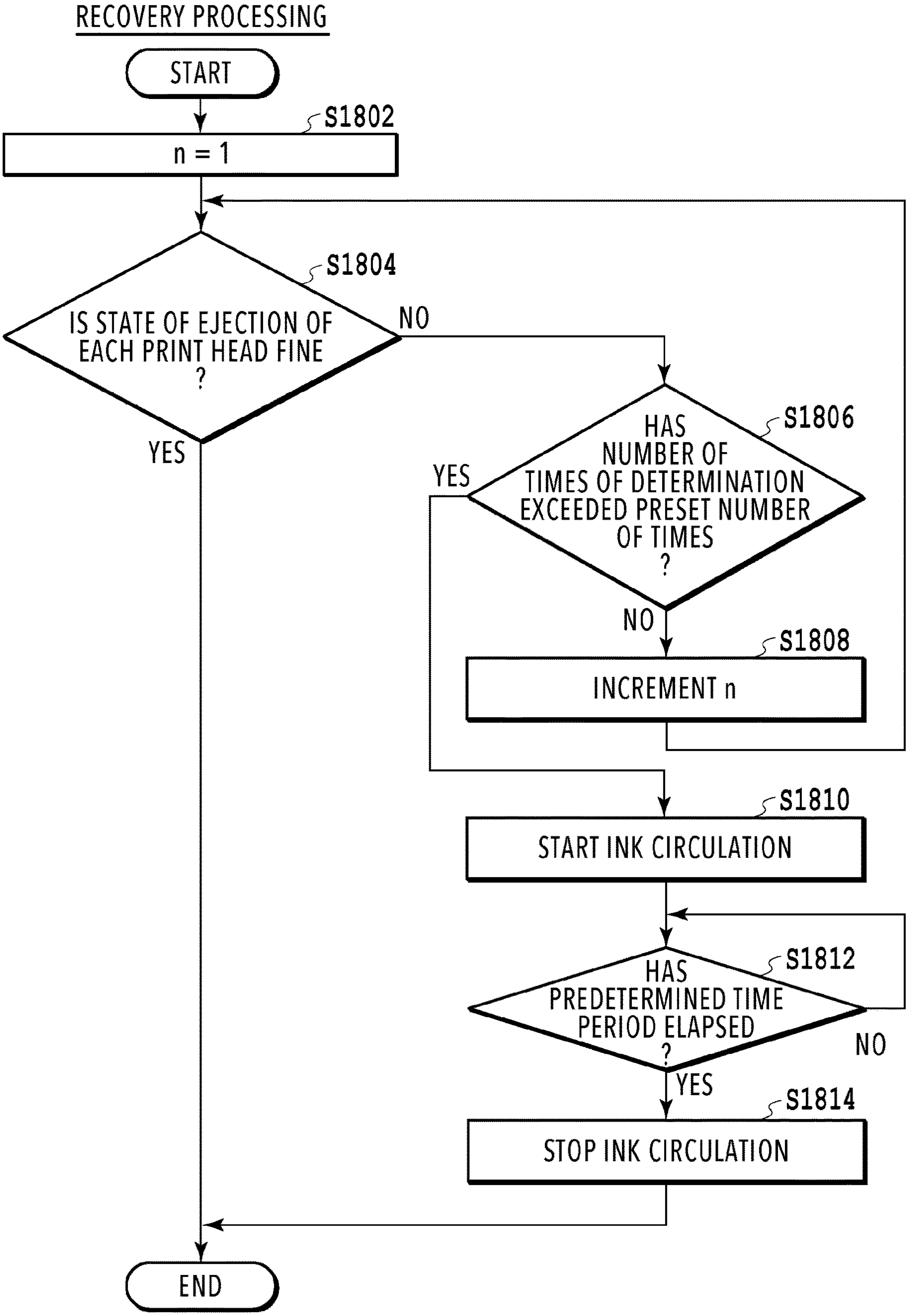

FIG. 4A, FIG. 4B, and FIG. 4C are views of a conveying path of a print medium fed from a first cassette;

FIG. 5 is a view of the printing apparatus in a maintenance state;

FIG. 6A and FIG. 6B are perspective views illustrating the configuration of a maintenance unit;

FIG. 7 is a schematic configuration diagram of an ink supply system;

FIGS. 8A and 8B are diagrams to explain flow paths including ejection openings;

FIGS. 9A, 9B, and 9C are diagrams to explain an ink ejection operation at an ejection part;

FIG. 10 is a flowchart showing detailed processing contents of determination processing;

FIG. 11 is a table showing correlations among amplitude information, cycle information, and determination information;

FIGS. 12A and 12B are flowcharts showing detailed processing contents of first print processing and second print processing;

FIG. 13 is a flowchart showing detailed processing contents of third print processing;

FIGS. 14A and 14B are tables showing thresholds used in a first determination method;

FIGS. 15A and 15B are tables showing thresholds used in a second determination method;

FIG. 16 is a diagram to explain a third determination method;

FIG. 17 is a flowchart showing detailed processing contents of recovery processing in a second embodiment;

FIG. 18 is a flowchart showing detailed processing contents of recovery processing in a third embodiment and;

FIG. 19 is a table showing recovery operations corresponding to the numbers of ejection parts having ejection abnormality.

DESCRIPTION I/F THE EMBODIMENTS

Embodiments of the present disclosure will be described below in detail with reference to the drawings. It is to be noted that the following embodiments are not intended to limit the scope of the present disclosure, and that all of the combination of the characteristics described in the embodiments are not always essential for the solution of the present disclosure. Here, relative layouts, shapes, and other features of the constituents described in the embodiments are mere examples and are not intended to limit the scope of the present disclosure only to the relevant descriptions. In the following embodiments, an inkjet printing apparatus will be explained as an example of a liquid ejection apparatus that includes a liquid ejection head configured to eject liquid droplets.

First Embodiment

Figure 1:
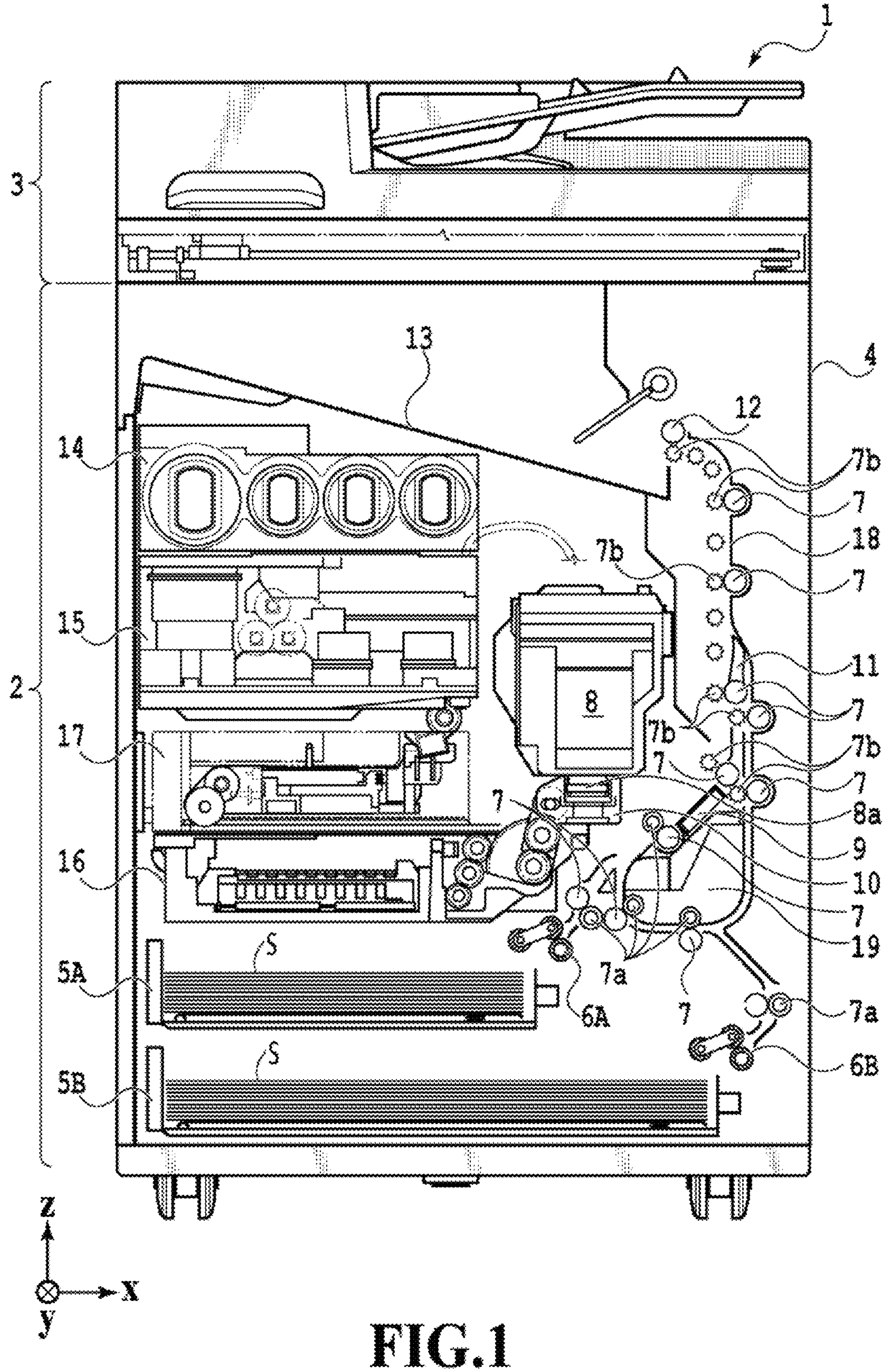
FIG. 1 is a view of a printing apparatus in a standby state.

An inkjet printing apparatus according to a first embodiment of the present disclosure will be described with reference to FIG. 1 to FIG. 16 to begin with. FIG. 1 is an internal configuration diagram of an inkjet printing apparatus 1 (hereinafter referred to as a printing apparatus 1) used in this embodiment. In FIG. 1, the x direction indicates a horizontal direction, the y direction (a direction perpendicular to the sheet surface) indicates a direction of arrangement of ejection openings in a print head 8 to be described later, and the z direction indicates a vertical direction, respectively.

The printing apparatus 1 is a multifunction printer including a print unit 2 and a scanner unit 3. The printing apparatus 1 can use the print unit 2 and the scanner unit 3 separately or in synchronization to perform various processes related to print operation and scan operation. The scanner unit 3 includes an automatic document feeder (ADF) and a flatbed scanner (FBS) and is capable of scanning a document automatically fed by the ADF as well as scanning a document placed by a user on a document plate of the FBS. The present embodiment is directed to the multifunction printer including both the print unit 2 and the scanner unit 3, but the scanner unit 3 may be omitted. FIG. 1 shows the printing apparatus 1 in a standby state in which neither print operation nor scan operation is performed.

A first cassette 5A and a second cassette 5B that house print media (cut sheets) S are mounted in an attachable and detachable manner at a bottom portion of the print section 2 on the lower side of a housing 4 in the vertical direction. The first cassette 5A houses relatively small print media of up to a size of A4 in the form of a flat pile. The second cassette 5B houses relatively large print media of a size of up to A3 in the form of a flat pile. Near the first cassette 5A, a first feed unit 6A is provided which separately feeds the housed print media. Likewise, a second feed unit 6B is provided near the second cassette 5B. When a print operation is performed, a print medium S is fed selectively from one of the cassettes.

Conveying rollers 7, a discharge roller 12, pinch rollers 7*a*, spurs 7*b*, a guide 18, an inner guide 19, and a flapper 11 are conveying mechanisms that guide print media S in predetermined directions. The conveying rollers 7 are drive rollers disposed upstream and downstream of the print head 8 and driven by a conveying motor not illustrated. The pinch rollers 7*a* are driven rollers that rotate while nipping a print medium S with the conveying rollers 7. The discharge roller 12 is a drive roller disposed downstream of the conveying rollers 7 and driven by a conveying motor not illustrated. The spurs 7*b* convey a print medium S while holding it between themselves and the conveying rollers 7 disposed downstream of the print head 8 and the discharge roller 12.

The guide 18 is provided along a conveying path for print media S and guides a print medium S in predetermined directions. The inner guide 19 is a member extending in the y direction and having a curved side surface and guides a print medium S along this side surface. The flapper 11 is a member that switches the direction of conveyance of a print medium S in a double-sided print operation. A discharge tray 13 is a tray on which to place and hold print media S discharged by the discharge roller 12 after completing their print operations.

The print head 8 of in the embodiments is a full-line color inkjet print head, in which the ejection openings capable of ejecting ink according to print data are arrayed along the y-direction of FIG. 1 by the length corresponding to the width of a print medium S. Specifically, the print head 8 is configured to be capable of ejecting ink of multiple colors. In the state in which the print head 8 is at a standby position, the ejection opening surface 8*a* of the print head 8 faces vertically downward and is capped with a cap unit 10 as illustrated in FIG. 1. In print operation, the orientation of the print head 8 is changed by a print controller 202 described later such that the ejection opening surface 8*a* faces a platen 9. The platen 9, composed of a flat plate extending in the y-direction, supports a print medium S from its back surface while the print head 8 is performing print operation on the print medium S. The movement of the print head 8 from the standby position to a printing position will be described later in detail.

An ink tank unit 14 stores inks of four colors to be supplied to the print head 8. An ink supply unit 15 is provided at a point along a flow channel connecting the ink tank unit 14 and the print head 8 and adjusts the pressure and flow rate of the inks inside the print head 8 within appropriate ranges. This embodiment employs a circulatory ink feed system. The ink supply unit 15 adjusts the pressure of the inks to be supplied to the print head 8 and the flow rate of the inks collected from the print head 8 within appropriate ranges.

A maintenance unit 16 includes the cap unit 10 and a wiping unit 17 and operates them with a predetermined timing to perform a maintenance operation on the print head 8. The maintenance operation will be described later in detail.

Figure 2:
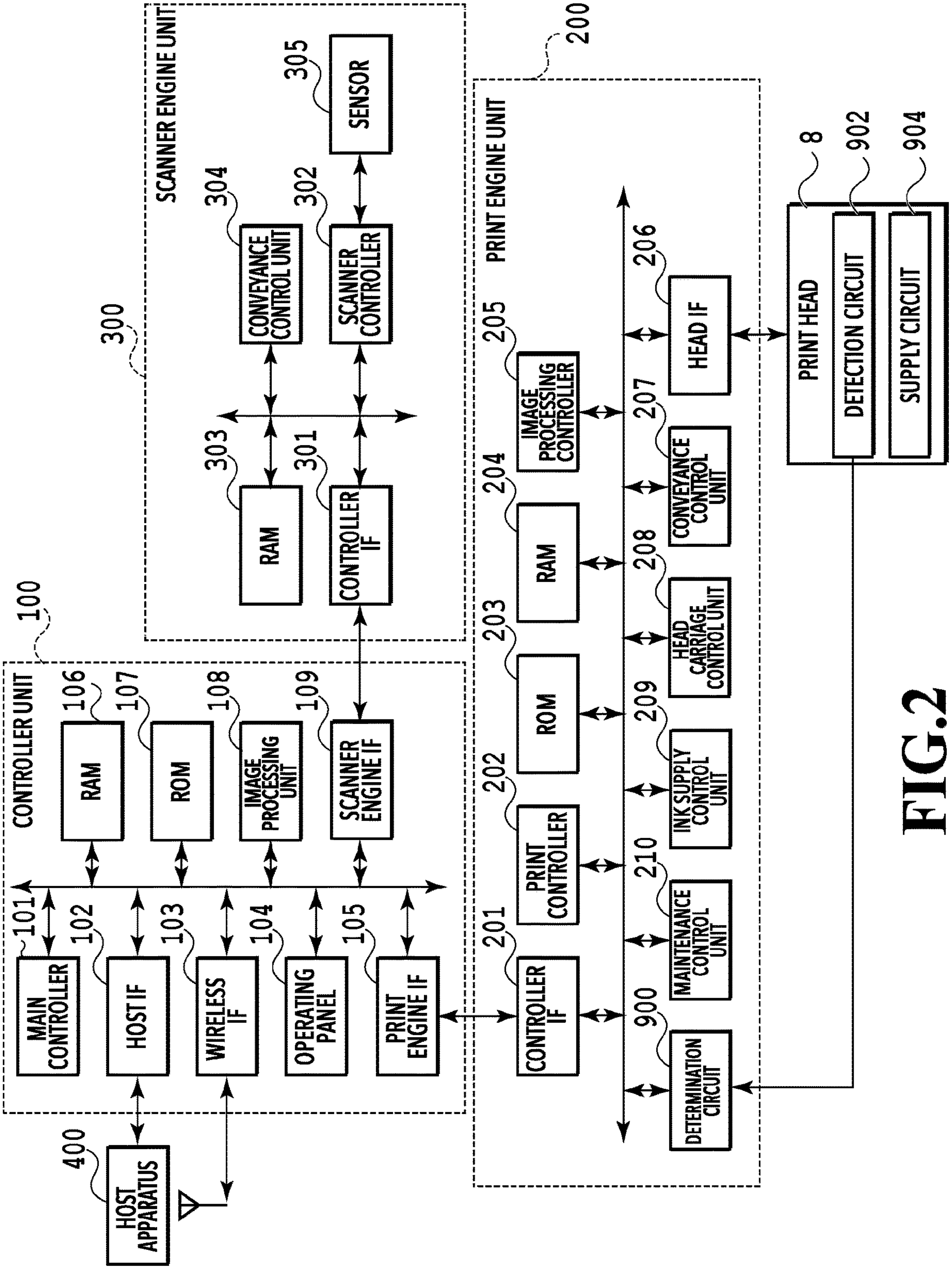
FIG. 2 is a diagram of a control configuration of the printing apparatus.

FIG. 2 is a block diagram illustrating a control configuration in the printing apparatus 1. The control configuration mainly includes a print engine unit 200 that controls the print section 2, a scanner engine unit 300 that controls the scanner section 3, and a controller unit 100 that controls the whole printing apparatus 1. The print controller 202 controls various mechanisms of the print engine unit 200 in accordance with instructions from a main controller 101 of the controller unit 100. Various mechanisms of the scanner engine unit 300 are controlled by the main controller 101 of the controller unit 100. Details of the control configuration will be described below.

In the controller unit 100, the main controller 101, configured of a CPU, controls the entire printing apparatus 1 by using an RAM 106 as a work area in accordance with programs and various parameters stored in an ROM 107. For example, upon input of a print job from a host apparatus 400 through a host I/F 102 or a wireless I/F 103, an image processing unit 108 performs predetermined image processing on received image data in accordance with an instruction from the main controller 101. The main controller 101 then transmits the image data after the image processing to the print engine unit 200 through a print engine I/F 105.

Meanwhile, the printing apparatus 1 may obtain image data from the host apparatus 400 by means of wireless communication or wired communication or from an external storage device (such as a USB memory) connected to the printing apparatus 1. The communication method used for the wireless communication or the wired communication is not particularly limited. For example, Wireless Fidelity (Wi-Fi) (registered trademark) or Bluetooth (registered trademark) can be employed as the communication method used for the wireless communication. In addition, universal serial bus (USB) or the like can be employed as the communication method used for the wired communication. Further, for example, upon input of a read command from the host apparatus 400, the main controller 101 transmits this command to the scanner section 3 through a scanner engine I/F 109.

An operating panel 104 is a mechanism with which the user inputs and receives information into and from the printing apparatus 1. Through the operating panel 104, the user can instruct the controller unit 100 to perform operations such as photocopying and scanning, set a print mode, check information on the printing apparatus 1, and so on.

In the print engine unit 200, the print controller 202, configured of a CPU, controls various mechanisms of the print section 2 by using an RAM 204 as a work area in accordance with programs and various parameters stored in an ROM 203. Upon receipt of various commands and image data through a controller I/F 201, the print controller 202 temporarily stores them in an RAM 204. The print controller 202 causes an image processing controller 205 to convert the stored image data into print data so that the print head 8 can use the stored image data in a print operation. After the print data is generated, the print controller 202 causes the print head 8 to perform a print operation based on the print data through a head I/F 206. In doing so, the print controller 202 conveys a print medium S by driving the feed unit 6A or 6B, the conveying rollers 7, the discharge roller 12, and the flapper 11, which are illustrated in FIG. 1, through a conveyance control unit 207. A print process is performed by performing a print operation with the print head 8 in combination with the operation of conveying the print medium S in accordance with instructions from the print controller 202.

A head carriage control unit 208 changes the orientation and position of the print head 8 in accordance with the operation state of the printing apparatus 1 such as a maintenance state or a print state. An ink supply control unit 209 controls the ink supply unit 15 such that the pressure of the inks to be supplied to the print head 8 fall within an appropriate range. A maintenance control unit 210 controls the operation of the cap unit 10 and the wiping unit 17 of the maintenance unit 16 when a maintenance operation is performed on the print head 8.

For the scanner engine unit 300, the main controller 101 controls hardware resources in a scanner controller 302 by using the RAM 106 as a work area in accordance with programs and various parameters stored in the ROM 107. As a result, various mechanisms of the scanner section 3are controlled. For example, the main controller 101 controls hardware resources in the scanner controller 302 through a controller I/F 301 such that a document loaded on the ADF by the user is conveyed through a conveyance control unit 304 and read by a sensor 305. Then, the scanner controller 302 stores the read image data in an RAM 303. Meanwhile, by converting the image data thus obtained into print data, the print controller 202 can cause the print head 8 to perform a print operation based on the image data read by the scanner controller 302.

Figure 3:
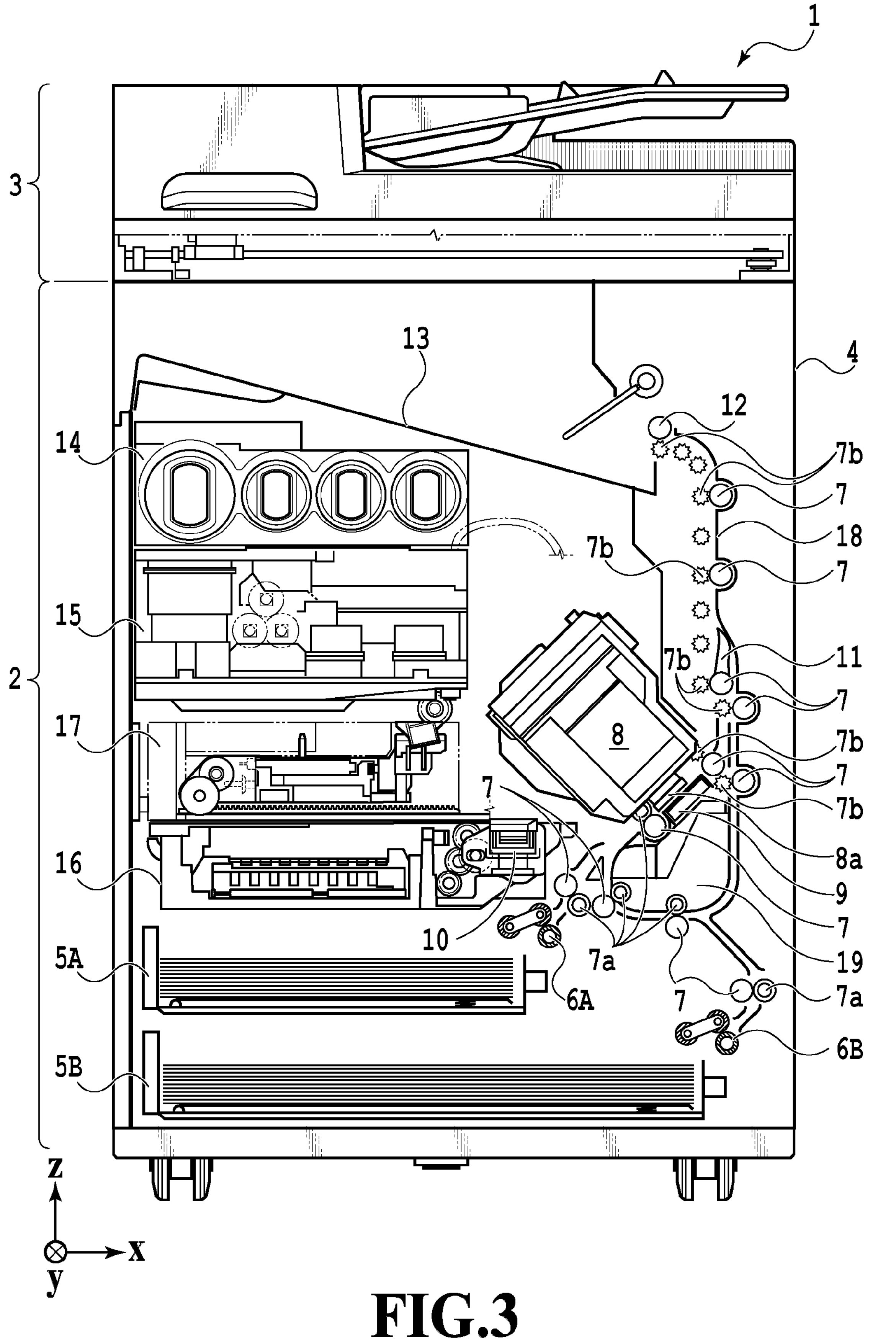
FIG. 3 is a view of the printing apparatus in a print state.

FIG. 3 illustrates the printing apparatus 1 in a print state. In contrast to the standby state illustrated in FIG. 1, the cap unit 10 is separated from the ejection opening surface 8*a* of the print head 8, and the ejection opening surface 8*a* is facing the platen 9. In this embodiment, the plane of the platen 9 is tilted at approximate 45 degrees with respect to the horizontal direction, and the ejection opening surface 8*a* of the print head 8 at the print position is also tilted at approximately 45 degrees with respect to the horizontal direction so that the distance between the ejection opening surface 8*a* and the platen 9 can be kept at a fixed distance.

When the print head 8 is moved from the standby position illustrated in FIG. 1 to the print position illustrated in FIG. 3, the print controller 202 lowers the cap unit 10 to a retreat position illustrated in FIG. 3 by using the maintenance control unit 210. As a result, the ejection opening surface 8*a* of the print head 8 is separated from a cap member 10*a*. Then, using the head carriage control unit 208, the print controller 202 turns the print head 8 by 45 degrees while adjusting its height level in the vertical direction, to thereby make the ejection opening surface 8*a* face the platen 9. The print controller 202 performs the reverse of the above steps when moving the print head 8 from the print position to the standby position after a print operation is completed.

Next, the conveying paths for print media S in the print section 2 will be described. Upon input of a print command, the print controller 202 firstly moves the print head 8 to the print position illustrated in FIG. 3 by using the maintenance control unit 210 and the head carriage control unit 208. The print controller 202 then drives the first feed unit 6A or the second feed unit 6B based on the print command and feeds a print medium S by using the conveyance control unit 207.

FIG. 4A, FIG. 4B, and FIG. 4C are views illustrating a conveying path used in a case of feeding an A4 print medium S stored in the first cassette 5A. The print medium S stacked at the top in the first cassette 5A is separated from the second and lower print media by the first feed unit 6A and conveyed toward a printing region P between the platen 9 and the print head 8 while being nipped between some conveying rollers 7 and pinch rollers 7*a*. FIG. 4A illustrates a conveying state immediately before the leading edge of the print medium S reaches the printing region P. The direction of travel of the print medium S is changed from the horizontal direction (x-direction) to a direction tilted at approximately 45 degrees with respect to the horizontal direction by the time the print medium S reaches the printing region P after being fed by the first feed unit 6A.

At the printing region P, the inks are ejected toward the print medium S from the plurality of ejection ports provided in the print head 8. The platen 9 supports the back surface of the region of the print medium S to which the inks are to be applied, and the distance between the ejection port surface 8*a* and the print medium S is kept at a fixed distance. After the inks are applied, the print medium S passes the left side of the flapper 11, whose tip is tilted toward the right side, and is conveyed upward in the vertical direction of the printing apparatus 1 along the guide 18 while being guided by some conveying rollers 7 and spurs 7*b*. FIG. 4B illustrates a state where the leading edge of the print medium S has passed the printing region P and is being conveyed upward in the vertical direction. The direction of travel of the print medium S has been changed to the vertically upward direction by the conveying rollers 7 and spurs 7*b* from the position of the printing region P, which is tilted at approximately 45 degrees with respect to the horizontal direction.

After being conveyed vertically upward, the print medium S is discharged onto the discharge tray 13 by the discharge roller 12 and the spur 7*b*. FIG. 4C illustrates a state where the leading edge of the print medium S has passed the discharge roller 12 and is being discharged onto the discharge tray 13. The print medium S after being discharged is held on the discharge tray 13 in a state where its surface on which the image was printed by the print head 8 faces down.

Likewise, the A3 size print media S housed in the second cassette 5B are conveyed toward a printing region P between the platen 9 and the print head 8. Specifically, the print medium S stacked on the top in the second cassette 5B is separated from the second and later print media by the second feed unit 6B, and is conveyed toward the printing region P between the platen 9 and the print head 8 while being nipped by the conveying rollers 7 and the pinch rollers 7*a*.

Meanwhile, in the case of carrying out double-sided printing on the A4 size print medium S, a first surface (a front surface) is printed first and then a second surface (a rear surface) undergoes a print operation. A conveyance process in the case of printing the first surface is the same as that illustrated in FIGS. 4A, 4B, and 4C and explanations thereof will be omitted herein. As the print operation on the first surface by the print head 8 is completed and a tail end of the print medium S passes through the flapper 11, the print controller 202 rotates the conveying rollers 7 in reverse to convey the print medium S into the printing apparatus 1. In this instance, the flapper 11 is controlled by a not-illustrated actuator such that its tip end is inclined to the left side. Accordingly, a tip end of the print medium S (a rear end in the print operation on the first surface) is passed through the right side of the flapper 11 and conveyed downward in the vertical direction.

Thereafter, the print medium S is conveyed along the curved outer peripheral surface of the inner guide 19, and is conveyed again to the printing region P between the print head 8 and the platen 9. In this instance, the second surface of the print medium S faces the ejection opening surface 8*a* of the print head 8. The subsequent conveying path is the same as the case of printing the first surface as illustrated in FIGS. 4B and 4C. As the tip end of the print medium S is passed through the printing region P and is conveyed upward in the vertical direction, the flapper 11 is controlled by the not-illustrated actuator such that its tip end is moved to a position inclined to the right side.

Next, the maintenance operation on the print head 8 will be described. As also described with reference to FIG. 1, the maintenance unit 16 in this embodiment includes the cap unit 10 and the wiping unit 17 and operates them with a predetermined timing to perform the maintenance operation.

FIG. 5 is a view of the printing apparatus 1 in the maintenance state. To move the print head 8 from the standby position illustrated in FIG. 1 to a maintenance position illustrated in FIG. 5, the print controller 202 moves the print head 8 upward in the vertical direction and moves the cap unit 10 downward in the vertical direction. The print controller 202 then moves the wiping unit 17 in the rightward direction in FIG. 5 from its retreat position. The print controller 202 thereafter moves the print head 8 downward in the vertical direction to thereby move it to the maintenance position, at which the maintenance operation can be performed.

Also, to move the print head 8 from the print position illustrated in FIG. 3 to the maintenance position illustrated in FIG. 5, the print controller 202 moves the print head 8 upward in the vertical direction while turning it by 45 degrees. The print controller 202 then moves the wiping unit 17 in the rightward direction from its retreat position. The print controller 202 thereafter moves the print head 8 downward in the vertical direction to thereby move it to the maintenance position, at which the maintenance operation by the maintenance unit 16 can be performed.

FIG. 6A is a perspective view illustrating the maintenance unit 16 at its standby position. FIG. 6B is a perspective view illustrating the maintenance unit 16 at its maintenance position. FIG. 6A corresponds to FIG. 1, and FIG. 6B corresponds to FIG. 5. When the print head 8 is at its standby position, the maintenance unit 16 is at its standby position illustrated in FIG. 6A and therefore the cap unit 10 is moved upward in the vertical direction and the wiping unit 17 is housed in the maintenance unit 16. The cap unit 10 has a cap member 10*a* in a box shape extending in the y-direction, which is brought into close contact with the ejection opening surface 8*a* of the print head 8 to prevent the evaporation of liquid in ink through the ejection openings. The cap unit 10 also has a function of collecting the inks ejected onto the cap member 10*a* for preliminary ejection or the like and sucking the collected inks with a suction pump not illustrated.

On the other hand, at the maintenance position illustrated in FIG. 6B, the cap unit 10 is moved downward in the vertical direction and the wiping unit 17 is pulled out of the maintenance unit 16. The wiping unit 17 includes two wiper units, namely a blade wiper unit 171 and a vacuum wiper unit 172.

In the blade wiper unit 171, blade wipers 171*a* that wipe the ejection opening surface 8*a* in the x direction are disposed along the y direction over a length corresponding to the region along which the ejection ports are aligned. To perform a wiping operation using the blade wiper unit 171, the wiping unit 17 moves the blade wiper unit 171 in the x direction with the print head 8 positioned at such a height level that the print head 8 can contact the blade wipers 171*a*. With this movement, the blade wipers 171*a* wipe the inks and the like attached to the ejection opening surface 8*a*.

At the inlet of the maintenance unit 16 through which the blade wipers 171*a* are housed, a wet wiper cleaner 16*a* is disposed which removes the inks attached to the blade wipers 171*a* and applies a wetting liquid to the blade wipers 171*a*. Each time the blade wipers 171*a* are housed into the maintenance unit 16, the matters attached to the blade wipers 171*a* are removed and the wetting liquid is applied thereto by the wet wiper cleaner 16*a*. Then, the next time the blade wipers 171*a* wipe the ejection opening surface 8*a*, the wetting liquid is transferred onto the ejection opening surface 8*a*, thereby improving the lubricity between the ejection opening surface 8*a* and the blade wipers 171*a*.

On the other hand, the vacuum wiper unit 172 includes a flat plate 172*a* with an opening portion extending in the y direction, a carriage 172*b* capable of moving in the y direction within the opening portion, and a vacuum wiper 172*c* mounted on the carriage 172*b*. The vacuum wiper 172*c* is disposed so as to be capable of wiping the ejection opening surface 8*a* in the y direction with movement of the carriage 172*b*. At the tip of the vacuum wiper 172*c*, a suction port is formed which is connected to a suction pump not illustrated. Thus, by moving the carriage 172*b* in the y direction with the suction pump actuated, the inks and the like attached to the ejection opening surface 8*a* of the print head 8 are wiped by the vacuum wiper 172*c* and sucked into the suction port. In this operation, the flat plate 172*a* and positioning pins 172*d* provided at opposite ends of its opening portion are used to position the ejection opening surface 8*a* relative to the vacuum wiper 172*c*.

In this embodiment, it is possible to perform a first wiping process in which the wiping operation by the blade wiper unit 171 is performed but the wiping operation by the vacuum wiper unit 172 is not performed and a second wiping process in which both wiping processes are sequentially performed. To perform the first wiping process, the print controller 202 first pulls the wiping unit 17 out of the maintenance unit 16 with the print head 8 retreated to above the maintenance position in FIG. 5 in the vertical direction. The print controller 202 then moves the print head 8 downward in the vertical direction to such a position that the print head 8 can contact the blade wipers 171*a*, and thereafter moves the wiping unit 17 to the inside of the maintenance unit 16. With this movement, the blade wipers 171*a* wipe the inks and the like attached to the ejection opening surface 8*a*. Specifically, the blade wipers 171*a* wipe the ejection opening surface 8*a* as they are moved from the position to which the wiping unit 17 has been pulled out of the maintenance unit 16 to the inside of the maintenance unit 16.

After housing the blade wiper unit 171, the print controller 202 moves the cap unit 10 upward in the vertical direction to thereby bring the cap member 10*a* into tight contact with the ejection opening surface 8*a* of the print head 8. The print controller 202 then drives the print head 8 in this state to cause it to perform preliminary ejection, and sucks the inks collected in the cap member 10*a* with the suction pump.

On the other hand, to perform the second wiping process, the print controller 202 first slides the wiping unit 17 to pull it out of the maintenance unit 16 with the print head 8 retreated to above the maintenance position in FIG. 5 in the vertical direction. The print controller 202 then moves the print head 8 downward in the vertical direction to such a position that the print head 8 can contact the blade wipers 171*a*, and thereafter moves the wiping unit 17 to the inside of the maintenance unit 16. As a result, the wiping operation by the blade wipers 171*a* is performed on the ejection opening surface 8*a*. Subsequently, the print controller 202 slides the wiping unit 17 to pull it out of the maintenance unit 16 to a predetermined position with the print head 8 retreated to above the maintenance position in FIG. 5 in the vertical direction again. The print controller 202 then positions the ejection opening surface 8*a* and the vacuum wiper unit 172 relative to each other by using the flat plate 172*a* and the positioning pins 172*d* while lowering the print head 8 to the maintenance position illustrated in FIG. 5. The print controller 202 thereafter performs the above-described wiping operation by the vacuum wiper unit 172. The print controller 202 retreats the print head 8 upward in the vertical direction and houses the wiping unit 17, and then performs preliminary ejection into the cap member and the operation of sucking the collected inks with the cap unit 10, as in the first wiping process.

(Ink Supply Unit)

Next, a flow path configuration of an ink circulation system of this embodiment will be described with reference to FIG. 7. FIG. 7 is a diagram showing a flow path configuration of an ink circulation system including the ink supply unit 15 adopted by the printing apparatus 1 of this embodiment. The ink supplied from the ink tank unit 14 to the ink supply unit 15 is further supplied to the print head 8. While FIG. 7 illustrates a configuration corresponding to the ink of one of the colors, the same configuration is prepared for each color of the ink in reality. The ink supply unit 15 is basically controlled by the ink supply control unit 209 shown in FIG. 2. Now, the respective configurations in the ink supply unit 15 will be described below.

Ink circulates mainly between a sub-tank 151 and the print head 8. In the print head 8, ink ejection operation is performed based on image data and ink that was not ejected is collected back into the sub-tank 151.

The sub-tank 151 that contains a certain amount of ink is connected to a supply flow path C2 for supplying ink to the print head 8 and a collection flow path C4 for collecting ink from the print head 8. In other words, the sub-tank 151, the supply flow path C2, the print head 8, and the collection flow path C4 compose a circulation flow path (circulation path) in which ink circulates. The sub-tank 151 is also connected to an air flow path C0 in which air flows.

In the sub-tank 151 is provided a liquid level detection unit 151*a* including a plurality of electrode pins. The ink supply control unit 209 detects the presence/absence of a conducting current between those pins so as to grasp the height of the ink liquid level, that is, the amount of remaining ink inside the sub-tank 151. A vacuum pump P0 is a negative pressure generating source for reducing the pressure inside the sub-tank 151. An atmosphere release valve V0 is a valve for switching whether or not to make the inside of the sub-tank 151 communicate with atmosphere.

A main tank 141 is a tank that contains ink to be supplied to the sub-tank 151. The main tank 141 is configured to be detachable from the printing apparatus body. The sub-tank 151 and the main tank 141 are connected with a tank connection flow path C1, on which is provided a tank supply valve V1 for switching the connection between the sub-tank 151 and the main tank 141.

In the case where the liquid level detection unit 151*a* detects that the amount of ink inside the sub-tank 151 is less than a certain amount, the ink supply control unit 209 closes the atmosphere release valve V0, a supply valve V2, a collection valve V4, and a head replacement valve V5. In addition, the ink supply control unit 209 opens the tank supply valve V1. In this state, the ink supply control unit 209 activates the vacuum pump P0. This makes the pressure inside the sub-tank 151 negative, so that ink is supplied from the main tank 141 to the sub-tank 151. In the case where the liquid level detection unit 151*a* detects that the amount of ink inside the sub-tank 151 exceeds a certain amount, the ink supply control unit 209 closes the tank supply valve V1 and stops the vacuum pump P0.

The supply flow path C2 is a flow path for supplying ink from the sub-tank 151 to the print head 8, and on the supply flow path C2 are provided a supply pump P1 and the supply valve V2. During print operation, the supply pump P1 is driven with the supply valve V2 open, supplying ink to the print head 8 while circulating ink in the circulation path. The amount of ink ejected per unit time by the print head 8 varies according to image data. The flow rate of the supply pump P1 is determined such that the flow rate can support the print head 8 performing ejection operation that requires maximum ink consumption per unit time.

A relief flow path C3 is a flow path which is located upstream of the supply valve V2 and which connects the upstream side and the downstream side of the supply pump P1. On the relief flow path C3 is provided a relief valve V3 which is a differential pressure valve. The relief valve V3 is not opened or closed by a drive mechanism. The relief valve V3 is urged by a spring and configured to open in the case where the pressure reaches a specified pressure. For example, in the case where the amount of ink supply from the supply pump P1 per unit time is larger than the sum value of the amount of ejection of the print head 8 per unit time and the amount of flow (the amount of pulled-back ink) through a collection pump P2 per unit time, the relief valve V3 opens according to the pressure applied to the relief valve V3. As a result, a cyclic flow path is formed which is composed of part of the supply flow path C2 and the relief flow path C3. Providing the relief flow path C3 allows the amount of ink supply to the print head 8 to be adjusted according to the amount of ink consumed by the print head 8, thus stabilizing the pressure inside the circulation path irrespective of image data.

The collection flow path C4 is a flow path for collecting ink from the print head 8 back to the sub-tank 151, and the collection pump P2 and the collection valve V4 are provided on the collection flow path C4. The collection pump P2 serves as a negative pressure generating source to suck ink from the print head 8 at the time of circulating ink within the circulation path. Driving the collection pump P2 generates an appropriate differential pressure between an IN flow path 80*b* and an OUT flow path 80*c* inside the print head 8, so that ink can be circulated between the IN flow path 80*b* and the OUT flow path 80*c*.

The collection valve V4 is a valve for preventing backflow at the time of not performing print operation, that is, at the time of not circulating ink within the circulation path. In the circulation path of the present embodiment, the sub-tank 151 is located higher than the print head 8 in the vertical direction (see FIG. 1). For this reason, in the case where the supply pump P1 or the collection pump P2 is not driven, there is a possibility that ink flows back in the collection flow path C4 from the sub-tank 151 to the print head 8 due to a water head difference between the sub-tank 151 and the print head 8. In order to prevent such backflow, the collection valve V4 is provided on the collection flow path C4 in the present embodiment.

Note that the supply valve V2 also serves as a valve for preventing ink supply from the sub-tank 151 to the print head 8 while print operation is not performed, that is, while ink is not circulated within the circulation path.

A head replacement flow path C5 is a flow path connecting the supply flow path C2 and an air chamber (space in which ink is not contained) of the sub-tank 151, and the head replacement valve V5 is located on the head replacement flow path C5. One end of the head replacement flow path C5 is connected to a point upstream of the print head 8 and downstream of the supply valve V2 on the supply flow path C2. The other end of the head replacement flow path C5 is connected to an upper part of the sub-tank 151 to communicate with the air chamber inside the sub-tank 151. The head replacement flow path C5 is used in the case of pulling out ink from the print head 8 in use such as at the time of replacement of the print head 8 or at the time of transportation of the printing apparatus 1. The head replacement valve V5 is controlled by the ink supply control unit 209 so as to be closed except for a case of putting ink into the print head 8 and a case of collecting ink from the print head 8 via the head replacement valve V5.

Next, the flow path configuration inside the print head 8 will be described. The ink supplied from the supply flow path C2 to the print head 8 passes through a filter 83 and is then supplied to a first negative pressure control unit 81 and a second negative pressure control unit 82. The first negative pressure control unit 81 has a control pressure set to a low negative pressure (a negative pressure having a small pressure difference from an atmospheric pressure) such as −90 mmAq. The second negative pressure control unit 82 has a control pressure set to a high negative pressure (a negative pressure having a large pressure difference from the atmospheric pressure) such as −180 mmAq. The pressures in the first negative pressure control unit 81 and the second negative pressure control unit 82 are generated within appropriate ranges by driving the collection pump P2.

The print head 8 includes an ink ejection part 80 for ejecting ink. In this ink ejection part 80, a plurality of printing element substrates 80*a*, each having multiple, arrayed ejection openings, are arranged to form an elongate ejection opening array. A common supply flow path 80*b* (IN flow path) for guiding ink supplied from the first negative pressure control unit 81 and a common collection flow path 80*c* (OUT flow path) for guiding ink supplied from the second negative pressure control unit 82 also extend in the direction in which the printing element substrates 80*a* are arrayed. Each printing element substrate 80*a* has individual supply flow paths connected to the common supply flow path 80*b* and individual collection flow paths connected to the common collection flow path 80*c*. Thus, an ink flow is generated in each printing element substrate 80*a* such that ink flows in from the common supply flow path 80*b* having relatively lower negative pressure and flows out to the common collection flow path 80*c* having relatively higher negative pressure. A pressure chamber which communicates with each ejection opening and is charged with ink is provided on a path between the individual supply flow path and the individual collection flow path, so that an ink flow is also generated even in the ejection openings and pressure chambers where printing is not performed. In the case where ejection operation is performed in the printing element substrate 80*a*, part of the ink moving from the common supply flow path 80*b* to the common collection flow path 80*c* is ejected from the ejection opening and thus is consumed, and the ink that was not ejected moves into the collection flow path C4 through the common collection flow path 80*c*.

(Configuration of Printing Element Substrate 80*a*)

FIG. 8A is a partially enlarged schematic plan view of the printing element substrate 80*a* and FIG. 8B is a schematic cross-sectional view taken along the VIIIb-VIIIb section line in FIG. 8A. The printing element substrate 80*a* is provided with a pressure chamber 85 filled with the ink and ejection openings 86 to eject the ink. In the pressure chamber 85, printing elements 84 are provided at positions facing the ejection openings 86. Moreover, a plurality of individual supply flow paths 88 connected to the common supply flow path 80*b* and individual collection flow paths 89 connected to the common collection flow path 80*c* are formed in the printing element substrate 80*a* so as to correspond to the respective ejection openings 86.

To be more precise, inside the printing element substrate 80*a* provided are the printing elements 84 being the piezoelectric elements, the pressure chamber 85 filled with the ink, the ejection openings 86 communicating with the pressure chamber 85, and vibration plates 87 joined to the printing elements 84. Each printing element 84 is driven by a supply of a driving signal Vin, and this drive causes the printing element 84 to eject the ink in the pressure chamber 85 from the ejection opening 86.

The pressure chamber 85 is a space defined by a nozzle plate 90 provided with the ejection openings 86, the vibration plates 87, and flow path walls 91 and 92. The pressure chamber 85 communicates with a first reservoir 94 through a supply port 93. The first reservoir 94 communicates with a sub-tank 151 corresponding to the printing element substrate 80*a* through the individual supply flow path 88, the common supply flow path 80*b*, and the supply flow path C2. Meanwhile, the pressure chamber 85 communicates with a second reservoir 96 through a discharge port 95. The second reservoir 96 communicates with the corresponding sub-tank

151 through the individual collection flow path 89, the common collection flow path 80*c*, and the collection flow path C4.

According to the above-described configuration, a flow of the ink is generated in the printing element substrate 80*a* such that the ink flows in from the common supply flow path 80*b* having a relatively low negative pressure and flows out to the common collection flow path 80*c* having a relatively high negative pressure. To be more precise, the ink flows in the order of common supply flow path 80*b*, individual supply flow path 88, the first reservoir 94, the pressure chamber 85, the second reservoir 96, the individual collection flow path 89, and the common collection flow path 80*c*. As the ink is ejected by the printing element 84, part of the ink moving from the common supply flow path 80*b* to the common collection flow path 80*c* is ejected from the ejection opening 86 and is thus discharged to the outside of the print head 8. On the other hand, the ink, which is not ejected from the ejection opening 86, is collected by the collection flow path C4 through the common collection flow path 80*c*.

In the case where the print operation or a recovery operation to be described later takes place in the above-described configuration, the ink supply control unit 209 closes the tank supply valve V1 and the head replacement valve V5 while opening the atmosphere release valve V0, the supply valve V2, and the collection valve V4, and drives the supply pump P1 and the collection pump P2. Thus, the circulation path in the order of sub-tank 151, the supply flow path C2, the print head 8, the collection flow path C4, and the sub-tank 151 is established. In a case where the amount of ink supply per unit time from the supply pump P1 is larger than a total value of an amount of ejection per unit time from the print head 8 and an amount of flow per unit time in the collection pump P2, the ink flows from the supply flow path C2 into the relief flow path C3. In this way, the amount of flow of the ink flowing from the supply flow path C2 into the print head 8 is adjusted.

In the case where the print operation is not carried out, the ink supply control unit 209 stops the supply pump P1 and the collection pump P2, and closes the atmosphere release valve V0, the supply valve V2, and the collection valve V4. Thus, the flow of the ink in the print head 8 is stopped and the backflow due to the water head difference between the sub-tank 151 and the print head 8 is also suppressed. In addition, leakage or evaporation of the ink from the sub-tank 151 is also suppressed by closing the atmosphere release valve V0.

In the case of collecting the ink from the print head 8, the ink supply control unit 209 closes the atmosphere release valve V0, the tank supply valve V1, the supply valve V2, and the collection valve V4 while opening the head replacement valve V5, and drives the vacuum pump P0. In this way, the pressure inside the sub-tank 151 becomes negative and the ink inside the print head 8 is collected into the sub-tank 151 through the head replacement flow path C5. Hence, the head replacement valve V5 is a valve which is closed during the ordinary print operation and in the standby state and is opened at the time of collecting the ink from the print head 8. Note that the head replacement valve V5 is opened also at the time of filling the head replacement flow path C5 with the ink in the course of filling the print head 8 with the ink. In this embodiment, the ink supply control unit 209, the various pumps, and the like collectively function as a circulation unit that can implement circulation of the ink on the circulation path inclusive of the print head 8.

In this embodiment, the piezoelectric element that is displaced in accordance with a change in electric potential is adopted as the printing element 84. Here, it is possible to apply not only a unimorph type element but also a bimorph type element, a multilayer type element, and the like to the piezoelectric element. Specifically, as shown in FIG. 8B, the printing element 84 includes a first electrode Z1, a second electrode Z2, and a piezoelectric body Zm provided between the first electrode Z1 and the second electrode Z2. Then, a voltage is applied between the first electrode Z1 and the second electrode Z2 by electrically connecting the second electrode Z2 to an electric supply line (not shown) set to electric potential VBS and supplying the driving signal Vin to the first electrode Z1. Thereafter, the printing element 84 is displaced either in the +Z direction or the −Z direction depending on the applied voltage and the printing element 84 vibrates as a consequence. Here, the control of the printing element 84 is executed by the print controller 202 through the head I/F 206.

Each vibration plate 87 is installed in an opening portion defined by the flow path walls 91 and 92. The second electrode Z2 is coupled to the vibration plate 87. Accordingly, in the case where the printing element 84 is driven by the driving signal Vin and brought into vibration, the vibration plate 87 vibrates as well. Then, the volume of the pressure chamber 85 (the pressure inside the pressure chamber 85) is changed by the vibration of the vibration plate 87 and the ink filled in the pressure chamber 85 is ejected from the ejection opening 86. In the case where the ink inside the pressure chamber 85 is reduced as a consequence of ejection of the ink, the ink is supplied from the first reservoir 94 into the pressure chamber 85. Meanwhile, the ink is supplied from the sub-tank 151 to the first reservoir 94 through the supply flow path C2, the common supply flow path 80*b*, and the individual supply flow path 88. In the following description, a region including the printing elements 84, the pressure chamber 85 where the printing elements 84 are arranged, the ejection openings 86 formed at the positions facing the printing elements 84, and the vibration plates 87 joined to the printing elements 84 will be collectively referred to as an ejection part 97.

FIGS. 9A, 9B, and 9C are diagrams to explain an ink ejection operation at the ejection part 97. In the ink ejection operation, the print controller 202 first changes electric potential of a driving waveform signal supplied to the printing element 84 as the driving signal Vin in a state shown in FIG. 9A, thereby generating such a distortion that displaces the printing element 84 in the +Z direction. This displacement of the printing element 84 in the +Z direction causes the vibration plate 87 to bend in the +Z direction (see FIG. 9B). In the state where the vibration plate 87 is caused to bend in the +Z direction, the volume of the pressure chamber 85 at the ejection part 97 is expanded as compared to the state before causing the vibration plate 87 to bend in the +Z direction, that is, the state shown in FIG. 9A.

Next, the print controller 202 changes the electric potential of the driving waveform signal supplied to the printing element 84 as the driving signal Vin, thereby generating such a distortion that displaces the printing element 84 in the −Z direction. This displacement of the printing element 84 in the −Z direction causes the vibration plate 87 to bend in the −Z direction (see FIG. 9C). By causing the vibration plate 87 to bend in the −Z direction as described above, the volume of the pressure chamber 85 is suddenly contracted from the state of causing the vibration plate 87 to bend in the +Z direction, that is, in the state shown in FIG. 9B, whereby part of the ink filled in the pressure chamber 85 is ejected from the ejection opening 86 as an ink droplet.

(Determination of State of Ejection of Ink at Ejection Part)

At the ejection part 97, the driving signal Vin is supplied to the printing element 84 in the case of ejecting the ink, whereby the printing element 84 and the vibration plate 87 are displaced in the +Z direction and the −Z direction. Accordingly, the vibration is generated at the ejection part 97 at the time of ink ejection, and vibration attributable to the vibration generated at the time of ink ejection also remains after the ink ejection. The vibration that remains at the ejection part 97 after the ink ejection will be hereinafter referred to as "residual vibration" as appropriate.

<Configuration for Detecting State of Ejection at Ejection Part>

As shown in FIG. 2, the print head 8 is provided with a detection circuit 902 that generates a residual vibration signal based on the residual vibration generated by the ink ejection from each ejection part 97 in the printing element substrate 80*a*. Moreover, the print head 8 is provided with a supply circuit 904 that switches supply and non-supply of the driving signal Vin, which is outputted from the print controller 202 through the head I/F 206, to each ejection part 97 based on the image data. Meanwhile, the print engine unit 200 is provided with a determination circuit 900 that can determine the state of ejection of the ink at the ejection part 97 based on the residual vibration signal generated by the detection circuit 902.

The supply circuit 904 detects a detection signal based on the residual vibration generated as a consequence of ejection of the ink from the ejection part 97 associated with the drive of the printing element 84. Moreover, the supply circuit 904 is provided with a function to switch supply and non-supply of the detection signal to the detection circuit 902. The detection circuit 902 generates the residual vibration signal based on the detection signal supplied from the supply circuit 904. The detection circuit 902 is connected to the determination circuit 900, and the generated residual vibration signal is outputted to the determination circuit 900. The determination circuit 900 determines the state of ejection of the ink at the ejection part 97 based on the residual vibration signal. Then, the determination circuit 900 generates determination information indicating a result of determination, and outputs the generated determination information to the print controller 202. The print controller 202 will determine the state of ejection of the ink at the print head based on the determination information. In this embodiment, the determination circuit 900, the detection circuit 902, the supply circuit 904, and the like collectively function as a determination unit that determines the state of ejection of the ink at the ejection part 97.

<Determination Processing to Determine State of Ejection at Ejection Part>

In the printing apparatus 1, the determination circuit 900 performs determination processing to determine the state of ejection at the ejection part 97 based on the residual vibration signal generated by the detection circuit 902. Specifically, this determination processing is designed to determine whether or not the state of ejection of the ink is fine (normal) at each ejection part 97, in other words, whether or not each ejection part 97 is causing ejection abnormality. In this specification, an abnormal state of ejection of the ink at the ejection part 97, that is, a state where the ejection part 97 cannot correctly eject the ink will be generally referred to as the "ejection abnormality".

To be more precise, the "ejection abnormality" is a state where the ink cannot be ejected in accordance with an aspect defined by the driving signal Vin despite an attempt to eject the ink from the ejection part 97 by driving the printing element 84 with the driving signal Vin. Here, the aspect of the ink defined by the driving signal Vin is ejection of the ink from the ejection opening 86 in an amount defined by a waveform of the driving signal Vin and ejection of the ink at an ejection speed defined by the waveform. In other words, the state where the ink cannot be ejected in accordance with the aspect of the ink defined by the driving signal Vin includes not only the state where the ink cannot be ejected from the ejection part 97 but also a state where the ink is ejected from the ejection part 97 in an amount different from the amount of ejection of the ink defined by the driving signal Vin, for example. In addition, this state also includes a state where the ink cannot be shot at a desired shot position on the print medium because the ink is ejected at a different speed from an ejection speed of the ink defined by the driving signal Vin, for example.

FIG. 10 is a flowchart showing detained processing contents of the determination processing. The series of processing shown in the flowchart of FIG. 10 is implemented by causing the print controller 202 to load program codes stored in the ROM 203 on the RAM 204 and to execute the program codes. Alternatively, part or all of functions of the steps in FIG. 7 may be implemented by using hardware such as an ASIC and an electronic circuit. Note that a code "S" used in the description of the processing means a step in the flowchart. The same applies to other flowcharts in this specification.

Upon starting the determination processing, an ejection part targeted for detection of the residual vibration, or in other words, a target ejection part targeted for determination is first selected from the multiple ejection parts 97 provided to the respective printing element substrates 80*a* (S1002). Next, the target ejection part is caused to generate the residual vibration by vibrating the target ejection part (S1004). Specifically, in S1004, the ink is ejected from the ejection opening 86 of the target ejection part by driving the printing element 84 of the target ejection part. The supply circuit 904 detects the residual vibration which is caused by driving the printing element 84, and the detection signal based on the residual vibration is outputted from the supply circuit 904 to the detection circuit 902. Thereafter, the detection circuit 902 generates the residual vibration signal from the inputted detection signal (S1006). The generated residual vibration signal is outputted from the detection circuit 902 to the determination circuit 900.

Then, the determination circuit 900 determines the state of ejection of the target ejection part based on the residual vibration signal (S1008), and generates a result of the determination, namely, determination information indicating the state of ejection of the target ejection part (S1010). A method of determining the state of ejection of the target ejection part in S1008 will be described later. Meanwhile, the generated determination information is associated with information to specify the ejection part 97 targeted for determination and is stored in the ROM 203, for example. Thereafter, a determination is made as to whether or not the determination information is generated for all of the ejection parts 97 (S1012). The determination processing is terminated in the case where the determination is made that the determination information is generated for all of the ejection parts 97. On the other hand, in the case where it is determined that the determination information is not generated for all of the ejection parts 97 in S1012, the ejection part 97 yet to be determined is selected as the target ejection part 97 (S1014), and the processing returns to S1004.

<Method of Determining State of Ejection of Ejection Part>

Next, a description will be given of a method of determining ejection abnormality of the ejection part by the determination circuit 900. In general, the residual vibration generated at the ejection part 97 has a unique vibration frequency determined by the shape of the ejection opening 86, a weight of the ink filled in the pressure chamber 85, viscosity of the ink filled in the pressure chamber 85, and other factors. Moreover, the frequency of the residual vibration or the amplitude of the residual vibration usually turns out to be as follows depending on the cause of the ejection abnormality.

In the case where ejection abnormality is caused at the ejection part 97 due to bubbles entrapped in the pressure chamber 85, the frequency of the residual vibration becomes higher than that in the case where no bubbles are entrapped in the pressure chamber 85. Meanwhile, in the case where ejection abnormality is caused at the ejection part 97 due to adhesion of foreign matters such as paper dust in the vicinity of the ejection opening 86, the frequency of the residual vibration becomes lower than that in the case where there is no adhesion of such foreign matters. Moreover, in the case where ejection abnormality is caused at the ejection part 97 due to an increase in viscosity of the ink filled in the pressure chamber 85, the frequency of the residual vibration becomes lower than that in the case where there is no increase in viscosity of the ink. Furthermore, in the case where ejection abnormality is caused at the ejection part 97 because the pressure chamber 85 is not filled with the ink, the amplitude of the residual vibration becomes smaller.

The residual vibration signal generated by the detection circuit 902 takes on such a waveform that corresponds to the residual vibration generated at the target ejection part which is the target for determination of the state of ejection. Specifically, the residual vibration signal has the frequency corresponding to the frequency of the residual vibration generated at the target ejection part and takes on the amplitude corresponding to the amplitude of the residual vibration generated at the target ejection part. Accordingly, the determination circuit 900 can determine the state of ejection of the ink at the target ejection part based on the residual vibration signal. Note that the "determination of the state of ejection of the ink at the target ejection part" will also be referred to as "determination involving the target ejection part" in the following description.

In the determination involving the target ejection part, the determination circuit 900 measures a time length NTc for one cycle of the residual vibration signal and generates cycle information Info-T indicating a result of the measurement. Moreover, in the determination involving the target ejection part, the determination circuit 900 generates amplitude information Info-S indicating whether or not the residual vibration signal has prescribed amplitude. Specifically, in a period of measurement of the time length NTc for one cycle of the residual vibration signal, the determination circuit 900 determines whether or not the electric potential of the residual vibration signal is equal to or above a threshold potential Vth-O and equal to or below a threshold potential Vth-U. Here, the threshold potential Vth-O is electric potential higher than electric potential Vth-C at an amplitude center level of the residual amplitude signal while the threshold potential Vth-U is electric potential lower than the electric potential Vth-C. Moreover, in a case where a result of the determination is affirmative, a value "1" is set to the amplitude information Info-S as a value indicating that the residual amplitude signal has prescribed amplitude, for example. On the other hand, if the result of the determination is negative, a value "0" is set to the amplitude information Info-S as a value indicating that the residual amplitude signal does not have the prescribed amplitude, for example. Then, the determination circuit 900 generates determination information Stt indicating the result of determination of the state of ejection of the ink at the target ejection part based on the cycle information Info-T and the amplitude information Info-S.

FIG. 11 is a table showing correlations among the cycle information Info-T, the amplitude information Info-S, and the determination information Stt. In this embodiment, five pieces of the determination information Stt are generated as shown in FIG. 11 based on the amplitude information Info-S and the cycle information Info-T. Specifically, the determination circuit 900 determines the state of ejection of the target ejection part by comparing the time length NTc indicated by the cycle information Info-T with part or all of a threshold Tth1, a threshold Tth2, and a threshold Tth3, thereby generating the determination information Stt that represents the result of the determination.

The threshold Tth1 is a value that defines a boundary between the time length of one cycle of the residual vibration in the case where the state of ejection of the target ejection part is fine and the time length of one cycle of the residual vibration in the case where the bubbles are entrapped in the pressure chamber 85. The threshold Tth2 is a value that defines a boundary between the time length of one cycle of the residual vibration in the case where the state of ejection of the target ejection part is fine and the time length of one cycle of the residual vibration in the case of adhesion of the foreign matters in the vicinity of the ejection opening 86 of the target ejection part. The threshold Tth3 is a value that defines a boundary between the time length of one cycle of the residual vibration in the case of adhesion of the foreign matters in the vicinity of the ejection opening 86 of the target ejection part and the time length of one cycle of the residual vibration in the case where the viscosity of the ink in the pressure chamber 85 is increased. Here, the thresholds satisfy the relation expressed as "Tth1<Tth2<Tth3".

Then, in a case where the amplitude information Info-S is equal to "1" and the time length NTc indicated by the cycle information Info-T satisfies "Tth1≤NTc≤Tth2", the determination circuit 900 determines that the state of ejection of the ink at the target ejection part is fine. Then, the determination circuit 900 sets a value indicating that the state of ejection at the target ejection part is fine, such as a value "1", as the determination information Stt.

Meanwhile, in a case where the amplitude information Info-S is equal to "1" and the time length NTc indicated by the cycle information Info-T satisfies "NTc<Tth1", the determination circuit 900 determines that the ejection abnormality occurs at the target ejection part due to bubbles. Then, the determination circuit 900 sets a value indicating the occurrence of the ejection abnormality at the target ejection part due to the bubbles, such as a value "2", as the determination information Stt.

Meanwhile, in a case where the amplitude information Info-S is equal to "1" and the time length NTc indicated by the cycle information Info-T satisfies "Tth2<NTc≤Tth3", the determination circuit 900 determines that the ejection abnormality occurs at the vicinity of the ejection opening 86 of the target ejection part due to adhesion of foreign matters. Then, the determination circuit 900 sets a value indicating the occurrence of the ejection abnormality at the vicinity of the ejection opening 86 of the target ejection part due to adhesion of the foreign matters, such as a value "3", as the determination information Stt.

Meanwhile, in a case where the amplitude information Info-S is equal to "1" and the time length NTc indicated by the cycle information Info-T satisfies "Tth3<NTc", the determination circuit 900 determines that the ejection abnormality occurs at the target ejection part due to an increase in viscosity of the ink. Then, the determination circuit 900 sets a value indicating the occurrence of the ejection abnormality at the target ejection part due to the increase in viscosity of the ink, such as a value "4", as the determination information Stt.

Meanwhile, in a case where the amplitude information Info-S is equal to "0", the determination circuit 900 determines that the ejection abnormality occurs at the target ejection part. Then, the determination circuit 900 sets a value indicating the occurrence of the ejection abnormality at the target ejection part, such as a value "5", as the determination information Stt.

In this embodiment, the determination information Stt is set to any one of the pieces of information including five values from "1" to "5" in accordance with the state of ejection at the target ejection part and the cause thereof. However, the present disclosure is not limited only to this configuration. Specifically, the determination information Stt may be any one of two pieces of information including two values that indicate whether or not the time length NTc satisfies "Tth1≤NTc≤Tth2". In other words, the determination information Stt only needs to include the information indicating whether or not the state of ejection of the ink at the target ejection part is fine, or may be defined by using any of three values, four values, and six or more values of information depending the causes thereof. Here, the determination information Stt generated by the determination circuit 900 is associated with information to specify the target ejection part corresponding to the determination information Stt and stored in a storage area such as the RAM 204.

(Determination of State of Ejection of Ink at Print Head)

In this embodiment, the printing apparatus 1 is configured to circulate the ink during the print processing and thus to avoid an increase in viscosity of the ink in the vicinity of the ejection opening which is used less often, for example. Moreover, in addition to the above-mentioned wiping processing, the printing apparatus 1 is configured to resolve the ejection abnormality of the ink generated at the ejection part 97 by circulating the ink in the circulation path including the pressure chamber 85 and determining the state of ejection at the ejection part 97 involving ejection of the ink from the ejection opening 86.

In a case where a print instruction to instruct start of printing is inputted, either first print processing or second print processing is executed by the printing apparatus 1. The first print processing conducts the print operation only. The second print processing conducts the print operation and the recovery operation to determine the state of ejection of the ink in the print head 8 and to maintain or recover a fine state of ejection based on a result of the determination. Moreover, in the printing apparatus 1, third print processing is executed at a prescribed timing after the start of the print operation.

Specifically, in the case where a print job is inputted from the host apparatus 400 to the printing apparatus 1 or a print instruction is inputted from the operating panel 104 to the printing apparatus 1, the main controller 101 instructs the print controller 202 to execute the first print processing or the second print processing. Hence, the print controller 202 executes the first print processing or the second print processing.

In the case where the print instruction is inputted, the main controller 101 selects the first print processing or the second processing based on the content of the inputted print instruction or elapsed time from the previous print processing, for example. To be more precise, the main controller 101 selects the first print processing in a case where a user inputs a print instruction in accordance with the first print processing that does not execute the recovery operation, in a case where a preset time period has not passed yet since the previous print processing, or the like. On the other hand, the main controller 101 selects the second print processing in a case where the user inputs a print instruction in accordance with the second print processing that executes the recovery operation depending on the state of ejection of the ink in the print head 8, in a case where the preset time period has passed since the previous print processing, or the like. Note that the conditions to select the second print processing are not limited to the aforementioned conditions and may be set otherwise as appropriate.

Meanwhile, in a case where the main controller 101 determines that a predetermined timing has come after the start of the print operation based on the number of printed sheets, the printed amount, the printing time, and the like, the main controller 101 instructs the print controller 202 to execute the third print processing. Hence, the print controller 202 executes the third print processing. Here, the predetermined timing based on the number of printed sheets is determined based on the number of passed sheets measured with a sensor, for example. The predetermined timing based on the print amount is determined based on the number of printed dots, for example. The predetermined timing based on the printing time is determined based on elapsed time since the start or resumption of the print operation, for example.

<First Print Processing>

FIG. 12A is a flowchart showing detailed processing contents of the first print processing. Upon starting the first print processing, circulation of the inks is started to begin with (S1202). In S1202, the print controller 202 executes circulation of the ink in the circulation path through the ink supply control unit 209 and the head I/F 206 regarding each of the inks. Next, the print operation to perform printing on the print medium is executed (S1204). In S1204, the print controller 202 controls the head I/F 206, the conveyance control unit 207, and the head carriage control unit 208, thereby performing the print operation to convey the print medium and to perform printing on the print medium. Thereafter, a determination is made as to whether or not the print operation is completed (S1206). In the case where the print operation is determined to be completed, the circulation of the inks is stopped (S1208) and the first print processing is terminated. Specifically, in S1208, the print controller 202 stops circulation of the ink in the circulation path through the ink supply control unit 209 and the head I/F 206 regarding each of the inks.

<Second Print Processing>

FIG. 12B is a flowchart showing detailed processing contents of the second print processing. In this second print processing, the print operation is executed after determination of the state of ejection of the inks in the entire print head 8 based on the state of ejection of each of the ejection parts 97. Here, if an ink circulation operation is executed in the course of determining the state of ejection of the ejection part 97, a circulatory flow or the like may occur in the vicinity of the ejection opening 86, thus causing a variation in detection accuracy of the residual vibration at the ejection part 97. For this reason, in the second print processing, the ink is not circulated in the course of determining the state of ejection of the inks in the print head 8. In other words, in this embodiment, the print controller 202 functions as the control unit that performs control so as not to allow execution of the determination of the state of ejection of the inks in the print head 8 and the circulation of the inks in parallel.

Upon starting the second print processing, a determination is first made as to whether or not the state of ejection of each ink in the print head 8 is fine (S1210). Specifically, in S1210, the print controller 202 executes determination processing so as to determine the state of ejection of each ejection part 97 and determines whether or not the state of ejection of each ink in the print head 8 is fine based on a result of the determination. Though details of the determination as to whether or not the state of the ejection of the inks in the print head 8 is fine based on the state of ejection of each of the ejection parts 97 will be described later, the determination is basically made as follows. For example, in a case where the number of the ejection parts 97 determined to have ejection abnormality is equal to or below a first number determined in accordance with prescribed conditions, the print controller 202 determines that the state of ejection in the print head 8 is fine. On the other hand, in a case where the number of the ejection parts 97 determined to have ejection abnormality exceeds the first number, the print controller 202 determines that the state of ejection in the print head 8 is not fine, or in other words, that the print head 8 has ejection abnormality.

Incidentally, the printing apparatus that performs printing in accordance with the inkjet method is usually designed to execute complementary processing in a case of detection of the ejection part having ejection abnormality, in which the ink supposed to be ejected from the relevant ejection part is complemented with the ink ejected from an ejection part different from the aforementioned ejection part. Accordingly, if the number of the ejection parts 97 causing ejection abnormality is such a number within an allowance that does not bring about deterioration in quality of the printed image as a consequence of execution of the above-mentioned complementary processing, the state of ejection of the inks in the print head 8 is determined to be fine. On the other hand, if the number of the ejection parts 97 causing ejection abnormality is such a number beyond the allowance that leads to deterioration in quality of the printed image even after execution of the above-mentioned complementary processing, the state of ejection of the inks in the print head 8 is determined to be not fine.

In the case where the state of ejection of the inks in the print head 8 is determined to be not fine in S1210, wiping processing is executed by using the vacuum wiper unit 172 (S1212), and then the processing proceeds to S1214 to be described later. Instead, after S1212, the processing may return to S1210 to perform the determination again as to whether or not the state of ejection of the inks in the print head 8 is fine. Meanwhile, in the case where the state of ejection of the inks in the print head 8 is determined to be fine in S1210, the processing proceeds to S1214 to start the circulation of the inks and to execute the print operation (S1216). Thereafter, a determination is made as to whether or not the print operation is completed (S1218). In the case where the print operation is determined to be completed, the circulation of the inks is stopped (S1220) and the second print processing is terminated. Note that the specific processing contents from S1214 to S1220 are the same as the above-described processing from S1202 to S1208, and the explanations will therefore be omitted.

<Third Print Processing>

FIG. 13 is a flowchart showing detailed processing contents of the third print processing. In this third print processing, the state of ejection of the inks in the print head 8 is determined at a prescribed timing during the print operation. As with the second print processing, the determination of the state of ejection of the inks in the print head 8 and the circulation of the inks are not executed in parallel in the third print processing so as not to cause the variation in detection accuracy of the residual vibration at the ejection parts 97.

Upon starting the third print processing, the printing on the print medium is suspended (S1302) and the circulation of the inks is stopped (S1304). Specifically, in S1302, the print controller 202 suspends the printing on the print medium by controlling the head I/F 206, the conveyance control unit 207, and the head carriage control unit 208. Note that the specific processing contents in S1304 are the same as those in the above-described S1208 and the explanations will therefore be omitted.

Next, the determination is made as to whether or not the state of ejection of the inks in the print head 8 is fine (S1306). In the case where the state of ejection of the inks in the print head 8 is determined to be not fine in S1306, the wiping processing is executed (S1308) and the processing proceeds to S1310 to be described later. Meanwhile, in the case where the state of ejection of the inks in the print head 8 is determined to be fine in S1306, the processing proceeds to S1310 to start the circulation of the inks and to resume the print operation (S1312). Thereafter, the determination is made as to whether or not the print operation is completed (S1314). In the case where the print operation is determined to be completed, the circulation of the inks is stopped (S1316) and the third print processing is terminated. Note that the specific processing contents from S1306 to S1316 are the same as the above-described processing from S1210 to S1220, and the explanations will therefore be omitted. Note that the print operation will be resumed in S1312 from the point suspended in S1302.

The determination executed in S1306 as to whether or not the state of ejection of the inks in the print head 8 is fine is supposed to be executed after a lapse of a predetermined time period following the stop of the circulation of the inks in S1304. The predetermined time period is defined as a time period in which the circulatory flow of the ink circulating in the circulation path calms down, on in other words, a time period in which the detection accuracy of the residual vibration is no longer affected.

<Method of Determining State of Ejection of Inks in Print Head>

The following three determination methods, namely, a first determination method, a second determination method, and a third determination method can be used, for example, as a method for determining the state of ejection of the inks in the print head to be executed in the first print processing, the second print processing, and the third print processing described above. To be more precise, the state of ejection of the ink at each ejection part 97 is first determined in the determination processing, and then the state of ejection of the inks in the print head 8 is determined in accordance with any of the following determination methods based on the result of the determination.

First Determination Method

In the first determination method, the print controller 202 obtains the number of the ejection parts 97 determined to have ejection abnormality based on the determination information outputted from the determination circuit 900, and determines whether or not the state of ejection of the inks in the entire print head 8 is fine based on the obtained number. For example, the print head 8 is assumed to be a print head in which fifteen chips corresponding to the printing element substrates 80*a* are linearly arranged and each chip is provided with 1024 ejection parts 97 for each of ink colors so as to be capable of ejecting the inks of five colors. The inks of five colors are assumed to be black (K1, K2), cyan (C), magenta (M), and yellow (Y) inks. As described above, the ejection parts 97 include the printing elements 84, the pressure chambers 85, the ejection openings 86, and the like. The total number of the ejection parts 97 in this print head 8 is equal to 76800 (5×1024×15).

FIGS. 14A and 14B are tables showing thresholds set for the respective ink colors, which are used in the first determination method. In FIG. 14A, the numbers of the ejection parts 97 determined to have ejection abnormality are defined as the thresholds. In FIG. 14B, ratios of the ejection parts 97 determined to have ejection abnormality are defined as the thresholds. The thresholds shown in FIGS. 14A and 14B are mere examples and can therefore be changed as appropriate depending on the configuration of the print head 8 and other factors. As mentioned above, the printing apparatus that performs printing in accordance with the inkjet method is usually designed to execute the complementary processing to complement the ink ejected from the ejection part causing ejection abnormality. Accordingly, the thresholds used in the first determination method are defined as upper limit values with which it is possible to minimize or eliminate the adverse effect on the quality of the printed image by conducting the complementary processing, for example. The same applies to the second determination method and the third determination method described below. These thresholds are empirically obtained, for example.

In the first determination method, the number of the ejection parts 97 determined to have ejection abnormality is preset as the threshold for each of the ink colors as shown in FIG. 14A. Then, in the determination of ejection abnormality of the inks in the print head 8, the number of the ejection parts 97 determined to have ejection abnormality in the determination processing is compared with the corresponding threshold for each of the ink colors. In the case where the numbers of the ejection parts 97 determined to have ejection abnormality regarding all of the ink colors are equal to or below the corresponding thresholds, the print controller 202 determines that the state of ejection of inks in the print head 8 is fine. On the other hand, in the case where the number of the ejection parts 97 determined to have ejection abnormality regarding at least one of the ink colors exceeds the corresponding threshold, the print controller 202 determines that the state of ejection of inks in the print head 8 is not fine.

Meanwhile, a threshold is also set in terms of a total of all of the ink colors in addition to the thresholds for the respective ink colors. Even if the numbers of the ejection parts 97 determined to have ejection abnormality regarding the respective ink colors fall below the corresponding thresholds, the print controller 202 determines that the state of ejection of inks in the print head 8 is not fine in the case where a total number of the ejection parts 97 determined to have ejection abnormality regarding all of the colors exceeds the corresponding threshold. On the other hand, the print controller 202 determines that the state of ejection of inks in the print head 8 is fine in the case where the total number is equal to or below the corresponding threshold.

Here, a change in a printed image due to the ejection abnormality is apt to be more conspicuous in the case where the ejection abnormality occurs in the ejection parts 97 of the black ink. For this reason, it is preferable to set the threshold corresponding to each black ink to a relatively small value. On the other hand, a change in a printed image due to the ejection abnormality is apt to be less conspicuous in the case where ejection abnormality occurs in the ejection parts 97 of the yellow ink. For this reason, the threshold corresponding to the yellow ink can be set to a relatively large value.

Meanwhile, in the first determination method, the ratio of the ejection parts 97 determined to have ejection abnormality relative to the number of all of the ejection parts 97 of each of the ink colors may be preset as the threshold for each of the ink colors as shown in FIG. 14B. In this case, if the ratios of the ejection parts 97 determined to have ejection abnormality regarding all of the ink colors are equal to or below the corresponding thresholds, the print controller 202 determines that the state of ejection of inks in the print head 8 is fine. On the other hand, in the case where the ratio of the ejection parts 97 determined to have ejection abnormality regarding at least one of the ink colors exceeds the corresponding threshold, the print controller 202 determines that the state of ejection of inks in the print head 8 is not fine.

In this case as well, a ratio of a total number of the ejection parts 97 determined to have ejection abnormality in terms of all of the colors relative to the number of all of the ejection parts 97 is also set as a threshold. Even if the ratios regarding the respective ink colors fall below the corresponding thresholds, the print controller 202 determines that the state of ejection of inks in the print head 8 is not fine in the case where the ratio of the total number of the ejection parts 97 determined to have ejection abnormality regarding all of the colors exceeds the corresponding threshold. On the other hand, the print controller 202 determines that the state of ejection of inks in the print head 8 is fine in the case where this ratio is equal to or below the corresponding threshold.

Second Determination Method

In the second determination method, a determination is made as to whether or not the state of ejection of the inks in the entire print head 8 is fine based on the number of the ejection parts 97 determined to have ejection abnormality by the chip (the printing element substrate 80*a*) in the print head 8. As with the case of the first determination method described above, the print head 8 is assumed to be the print head in which fifteen chips corresponding to the printing element substrates 80*a* are linearly arranged and each chip is provided with 1024 ejection parts 97 for each of the ink colors so as to be capable of ejecting the inks of five colors.

FIGS. 15A and 15B are tables showing thresholds set for the respective chips, which are used in the second determination method. In FIG. 15A, the total numbers of the ejection parts 97 determined to have ejection abnormality regarding all of the ink colors are defined as the thresholds. In FIG. 15B, the numbers of the relevant ejection parts 97 in terms of the respective ink colors are defined as the thresholds. The thresholds shown in FIGS. 15A and 15B are mere examples and can therefore be changed as appropriate depending on the configuration of the print head 8 and other factors.

In the second determination method, the total number of the ejection parts 97 determined to have ejection abnormality is preset as the threshold for each of the ink colors and depending on each of the fifteen chips from zeroth to fourteenth chips as shown in FIG. 15A. Then, the total number of the ejection parts 97 determined to have ejection abnormality for each of the inks of each chip is compared with the corresponding threshold. In the case where the total numbers of the ejection parts 97 determined to have ejection abnormality regarding all of the chips are equal to or below the corresponding thresholds, the print controller 202 determines that the state of ejection of inks in the print head 8 is fine. On the other hand, in the case where the total number of the ejection parts 97 determined to have ejection abnormality regarding at least one of the chips exceeds the corresponding threshold, the print controller 202 determines that the state of ejection of inks in the print head 8 is not fine.

Here, a change in a printed image due to the ejection abnormality is apt to be more conspicuous in the case where ejection abnormality occurs in the ejection parts 97 of the chips located at a central part in the direction of arrangement. For this reason, it is preferable to set the thresholds corresponding to the chips located at the central part in the direction of arrangement to relatively small values. On the other hand, a change in a printed image due to the ejection abnormality is apt to be less conspicuous in the case where ejection abnormality occurs in the ejection parts 97 of the chips located on two end sides in the direction of arrangement. For this reason, the thresholds corresponding to the chips located on the two end sides in the direction of arrangement can be set to relatively large values.

Meanwhile, in the second determination method, the number of the ejection parts 97 determined to have ejection abnormality for each of the ink colors of each chip may be preset as the threshold as shown in FIG. 15B. In this case, if the numbers of the ejection parts 97 determined to have ejection abnormality regarding the respective ink colors of all of the chips are equal to or below the corresponding thresholds, the print controller 202 determines that the state of ejection of inks in the print head 8 is fine. On the other hand, in the case where the number of the ejection parts 97 determined to have ejection abnormality regarding any of the respective ink colors of at least one of the chips exceeds the corresponding threshold, the print controller 202 determines that the state of ejection of inks in the print head 8 is not fine.

In this case, it is preferable to set the threshold corresponding to each black ink to a relatively small value and the threshold corresponding to the yellow ink can be set to a relatively large value as with the first determination method. In the meantime, regarding each black ink, it is preferable to set the threshold corresponding to each of the chips located at the central part in the direction of arrangement to a relatively small value and the threshold corresponding to each of the chips located on the two end sides in the direction of arrangement can be set to a relatively large value.

Although the second determination method is designed to perform the determination based on the number of the ejection parts 97 determined to have ejection abnormality in each of the chips, the present disclosure is not limited only to the foregoing. Specifically, each chip may be subjected to the determination based on the number of the relevant ejection parts 97 for each of the ink colors, or on the ratio of the number of the ejection parts 97 determined to have ejection abnormality relative to the total number of the ejection parts 97 as discussed in the first determination method.

Third Determination Method

In the third determination method, a determination is made as to whether or not the state of ejection of the inks in the entire print head 8 is fine based on the number of the ejection parts 97 newly determined to have ejection abnormality while excluding the ejection parts 97 determined to have ejection abnormality and stored in advance. In the third determination method, the ejection parts 97 that failed to recover from (resolve) ejection abnormality in the previous recovery operation are stored as abnormality determined ejection parts, and the abnormality determined ejection parts are excluded from the targets for the determination as to whether or not the state of ejection of the entire print head 8 is fine. This makes it possible to reduce the time precluded from performing the print operation due to the recovery operation. The abnormality determined ejection parts are stored in the ROM 107 of the controller unit 100 or in the ROM 203 of the print engine unit 200, for example.

FIG. 16 is a diagram to explain a specific example of the third determination method. In FIG. 16, in order to facilitate the understanding, the number of ejection parts of each ink color is assumed to be ten ranging from ejection part codes 0 to 9. In the meantime, the threshold for each ink color is set to 15% so as to represent the ratio of the number of ejection parts 97 determined to have ejection abnormality relative to all of the ejection parts 97 for each ink color.

A result of the determination as shown in FIG. 16 is assumed to have been obtained as a consequence of execution of the determination processing. According to the result of the determination, concerning the ejection parts 97 that eject the black ink K1, two ejection parts 97 having ejection part codes “2” and “6” are determined to have ejection abnormality. Here, the ejection part code “2” has been stored in advance as the abnormality determined ejection part. For this reason, the number of the ejection parts 97 targeted for determination becomes nine ejection parts obtained by subtracting one abnormality determined ejection part from all of the ten ejection parts 97 in the determination based on the determination processing. Meanwhile, the number of the ejection parts 97 targeted for determination and determined to have ejection abnormality becomes one ejection part obtained by subtracting the one abnormality determined ejection part from the two ejection parts 97 actually determined to have ejection abnormality. In this way, the ratio of the ejection parts 97 determined to have ejection abnormality as a result of this determination processing becomes 11%, which is below the corresponding threshold of 15%. As a consequence, the state of ejection of the ink is determined to be fine regarding the ejection parts 97 that eject the black ink K1. Likewise, the state of ejection of the inks is determined to be fine regarding the ejection parts 97 that eject the cyan ink C, the magenta ink M, and the yellow ink Y as well.

Concerning the ejection parts 97 that eject the black ink K2, the ejection part code “4” is stored as the abnormality determined ejection part. Meanwhile, the two ejection parts 97 of the ejection part codes “8” and “9” are determined to have ejection abnormality in the recent determination processing. For this reason, the number of the ejection parts 97 targeted for determination becomes nine ejection parts, and the number of the ejection parts 97 targeted for determination and determined to have ejection abnormality becomes two ejection parts. Accordingly, the ratio of the ejection parts 97 determined to have ejection abnormality becomes 22%, which exceeds the corresponding threshold of 15%. As a consequence, the state of ejection of the ink is determined to be not fine regarding the ejection parts 97 that eject the black ink K2.

Thus, the determination is made as to whether or not the state of ejection of the ink of each ink color is fine. In the case of the result of the determination as shown in FIG. 16, that is, in the case where the state of ejection of the ink is determined to be not fine regarding the ejection parts 97 of at least one of the ink colors, the state of ejection of the inks in the print head 8 is determined to be not fine. On the other hand, in the case where the state of ejection of the inks is determined to be fine regarding the ejection parts 97 of all of the ink colors, the state of ejection of the inks in the print head 8 is determined to be fine. Concerning the state of ejection of the inks regarding the ejection parts 97 of each of the respective ink colors, the determination to be not fine is indicated with "NG" and the determination to be fine is indicated with "OK" in the column of "result of determination" in FIG. 16.

As described above, the printing apparatus 1 according to the first embodiment is configured to determine the state of ejection of the inks in the print head 8 based on the result of determination of the state of ejection of the ejection parts 97 by the determination processing while stopping the circulation of the inks. In this way, the printing apparatus 1 can detect the residual vibration of the ejection parts 97 at the time of ejecting the inks without reducing the detection accuracy, thereby accurately determining the state of ejection of the inks in the print head 8.

Second Embodiment

Next, an inkjet printing apparatus according to a second embodiment will be described with reference to FIG. 17. In the following description, the constituents which are the same as or corresponding to those in the above-described first embodiment will be denoted by the same reference numerals used in the first embodiment and detailed explanations thereof will be omitted.

The second embodiment is different from the above-described first embodiment in that recovery processing is executed for the print head 8 in the case where the printing apparatus 1 is turned on. Specifically, in the second embodiment, the recovery processing to determine the state of ejection of the ejection parts 97 and to execute a recovery operation based on a result of the determination is executed in the case where the printing apparatus 1 is turned on. To be more precise, in the case where there is an input from the host apparatus 400 or the operating panel 104 so as to turn the printing apparatus 1 on, the main controller 101 instructs the print controller 202 to execute the recovery processing. Hence, the print controller 202 executes the recovery processing. Here, the timing to execute the recovery processing of this embodiment is not limited only to the point to activate the apparatus. The recovery processing may be executed in a case where the print operation has not been executed for a predetermined time period or more after the activation of the apparatus, for example. If the inks are circulating in this instance, the recovery processing is supposed to be executed after stopping the circulation of the inks.

FIG. 17 is a flowchart showing detailed processing contents of the recovery processing to be executed by the printing apparatus 1 of the second embodiment. Upon starting the recovery processing, the state of ejection of each ejection parts 97 is determined to begin with, and then a determination is made as to whether or not the number of the ejection parts 97 in the print head 8 determined to have ejection abnormality exceeds a first value (S1702). Specifically, the determination processing shown in FIG. 10 is carried out in S1702, and the determination is made as to whether or not the number of the ejection part 97 determined to have ejection abnormality exceeds the first value based on a result of determination of this determination processing. Here, a lower limit value of the number of the ejection parts 97 having ejection abnormality that may potentially cause deterioration in quality of the printed image in a high image quality mode to print the print image at high image quality is set to the first value, for example.

In the case where the determination is made in S1702 that the number of the ejection parts 97 determined to have ejection abnormality does not exceed the first value, the determination of the state of ejection of the ejection parts 97, that is, the determination processing is executed for a predetermined number of times (S1704), and the recovery processing is terminated. Here, in the case of determining the state of ejection of the ejection parts 97, preliminary ejection is carried out as ejection of the ink from the ejection openings 86 which does not contribute to the printing. Meanwhile, in the case where the power is off, the liquid components of the inks evaporate from the ejection openings 86 even if the ejection openings 86 are capped with the cap unit 10 and the like, thereby increasing the concentration of the ink in the vicinity of each ejection opening 86. Such a concentrated ink with the increased concentration of the ink causes ejection abnormality in the corresponding ejection part 97. The concentrated ink in the ejection opening 86 can be removed by the preliminary ejection of the ink or the circulation of the ink instead of conducting the wiring processing and the like by using the vacuum wiper unit 172. Accordingly, the predetermined number of times is set to the number of times of preliminary ejection of the ink which is effective for removing the concentrated ink in the ejection opening 86.

In the meantime, in the case where the number of ejection parts 97 determined to have ejection abnormality is determined to exceed the first value in S1702, a determination is made as to whether or not the number of ejection parts 97 determined to have ejection abnormality exceeds a second value (S1706). Here, a lower limit value of the number of the ejection parts 97 having ejection abnormality that is larger than the first value and may potentially cause deterioration in quality of the printed image in a standard mode to print the print image at standard image quality is set to the second value, for example.

The circulation of the inks is started (S1708) in the case where the determination is made in S1706 that the number of the ejection parts 97 determined to have ejection abnormality does not exceed the second value. Specifically, in S1708, the print controller 202 executes circulation of the inks in the circulation paths regarding the respective inks through the ink supply control unit 209 and the head I/F 206. In the meantime, the print controller 202 starts counting the time. Thereafter, a determination is made as to whether or not a predetermined time period has elapsed (S1710). In the case where the determination is made that the predetermined time period has elapsed, the circulation of the inks is stopped (S1712) and the recovery processing is terminated. Specifically, in S1710, the print controller 202 determines whether or not the counted time has elapsed for the predetermined time period. Meanwhile, in S1712, the print controller 202 stops the circulation of the inks in the circulation paths regarding the respective inks through the ink supply control unit 209 and the head I/F 206.

In the meantime, in the case where the number of the ejection parts 97 determined to have ejection abnormality is determined to be equal to the second value that is larger than the first value, it is likely that the evaporation of the liquid components in the ink from the ejection openings 86 is in progress and the concentration of the ink is further increased while the power is turned off. Here, the progression of the increase in concentration of the ink in the ejection opening 86 is basically a diffusion phenomenon. For this reason, the progression of the increase in concentration of the ink leads to an increase in concentration of the ink inside the pressure chamber 85. In this case, it is rather more effective to mix the concentrated ink in the pressure chamber 85 with the ink in the circulation system and thus to reduce the concentration than conducting the preliminary ejection of the ink. Accordingly, the predetermined time period is set to a circulation time period of the ink which is effective for removing the concentrated ink from the pressure chamber 85, for example.

On the other hand, in the case where the determination is made in S1706 that the number of the ejection parts 97 determined to have ejection abnormality exceeds the second value, the wiping processing is executed by using the vacuum wiper unit 172 (S1714) and the recovery processing is terminated. Specifically, in the case where the number of the ejection parts 97 determined to have ejection abnormality exceeds the second value, it is more likely that the concentration of the inks is further in progress. In this case, the circulation of the ink may require a long time or may fail to resolve the ejection abnormality. Accordingly, it is more appropriate to execute the wiping processing having a higher recovery effect by using the vacuum wiper unit 172.

As described above, the printing apparatus 1 according to the second embodiment is configured to determine the state of ejection of the inks at the ejection parts 97 at the timing to turn the power on, and to execute different recovery operations based on the result of the determination. This makes it possible to reduce the time required for the recovery processing.

Third Embodiment

Next, an inkjet printing apparatus according to a third embodiment will be described with reference to FIG. 18. In the following description, the constituents which are the same as or corresponding to those in the above-described first embodiment will be denoted by the same reference numerals used in the first embodiment and detailed explanations thereof will be omitted.

The third embodiment is different from the above-described first embodiment in that the recovery processing is executed for the print head 8 in the case where the printing apparatus 1 is turned on. Moreover, the third embodiment is different form the above-described second embodiment in that the state of ejection of the inks in the print head 8 is determined in the recovery processing and the recovery operation is executed based on a result of the determination.

Specifically, in the case where there is an input from the host apparatus 400 or the operating panel 104 so as to turn the printing apparatus 1 on, the main controller 101 instructs the print controller 202 to execute the recovery processing. Hence, the print controller 202 executes the recovery processing.

Here, as described above, in the case where the printing apparatus 1 has not been activated for a long time period, the liquid components of the inks evaporate from the ejection openings 86, thereby increasing the concentration of the ink in the vicinity of each ejection opening 86. Moreover, the concentrated ink with the increased concentration may cause ejection abnormality in the corresponding ejection part 97. In this embodiment, in order to deal with ejection abnormality of the ejection part 97 due to the concentrated ink, the determination processing, namely, the preliminary ejection of the ink or the circulation of the ink is executed as the recovery processing based on the number of times of determination of the state of ejection of the print head 8. As with the above-described second embodiment, the timing to execute the recovery processing of this embodiment is not limited only to the point to activate the apparatus. The recovery processing may be executed in the case where the print operation has not been executed for a predetermined time period or more after the activation of the apparatus, for example.

FIG. 18 is a flowchart showing detailed processing contents of the recovery processing to be executed by the printing apparatus 1 of the third embodiment. Upon starting the recovery processing, a variable n representing the number of times of determination of the state of ejection of the print head 8 is set to "1" to begin with (S1802), and a determination is made as to whether or not the state of ejection of the inks in the print head 8 is fine (S1804). The specific processing contents in S1804 are the same as the aforementioned S1210 and explanations thereof will be omitted.

The recovery processing is terminated in the case where the state of ejection of the inks in the print head 8 is determined to be fine in S1804. On the other hand, in the case where the state of ejection of the inks in the print head 8 is determined to be not fine in S1804, a determination is made as to whether or not the number of times of determination to determine the state of ejection of the print head 8 has exceeded a preset number of times (S1806). In this embodiment, a determination is made as to whether or not the number of times of determination has exceeded a preset number of times "10". Specifically, in this case, the print controller 202 determines whether or not "n>10" holds true in S1806. The preset number of times is set to such a number of times of preliminary ejection of the ink, which is effective for removing the concentrated ink in the ejection opening 86, for example.

In the case of the determination in S1806 that the number of times of determination has not exceeded the preset number of times, namely, that the "n>10" does not hold true, the variable n is incremented (S1808) and the processing returns to S1804. On the other hand, the circulation of the inks is started (S1810) in the case of the determination in S1806 that the number of times of determination has exceeded the preset number of times, namely, that the "n>10" holds true. Thereafter, a determination is made as to whether or not a predetermined time period has elapsed (S1812). The circulation of the inks is stopped (S1814) and the recovery processing is terminated in the case of the determination that the predetermined time period has elapsed. The specific processing contents from S1810 to S1814 are the same as the aforementioned contents from S1708 to S1712 and explanations thereof will be omitted. The predetermined time period is set to such a time period of the circulation of the inks which is effective for removing the concentrated ink after executing the preset number of times of determination of the state of ejection of the print head 8, for example.

As described above, the printing apparatus 1 according to the third embodiment is configured to determine the state of ejection of the inks in the print head 8 at the timing to turn the power on, and to execute the determination again or to execute the circulation of the inks as the recovery operation based on the result of the determination. This makes is possible to execute the recovery operation efficiently at the timing to turn on the power in addition to the operation and effect according to the first embodiment.

OTHER EMBODIMENTS

Note that the above-described embodiments may be modified as shown in the following sections (1) to (9).

(1) The above-described second embodiment is configured to execute the determination processing, the ink circulation, or the wiping processing by using the vacuum wiper unit 172 based on the value indicating the number of the ejection parts 97 having ejection abnormality. However, the present disclosure is not limited only to this configuration. Specifically, the above-mentioned processing may be executed based on the ratio of the number of the ejection parts 97 having ejection abnormality relative to the total number of the ejection parts 97. In this case, the first value and the second value constituting the thresholds may be defined as values that indicate appropriate ratios. Alternatively, a determination may be made by a prescribed unit such as by the ink color and by the chip. In the case of the determination by the ink color, for example, the number of the ejection parts 97 having ejection abnormality is obtained by the ink color, and the determination processing is executed for a predetermined number of times in the case where the numbers obtained for all of the ink colors are equal to or below the first value. On the other hand, in the case where the number obtained for at least one of the ink colors exceeds the first value, a confirmation is made as to whether or not the relevant value exceeds the second value. Then, the circulation of the inks is carried out in the case the number does not exceed the second value and the wiping processing is carried out in the case where the number exceeds the second value.

(2) The third embodiment is configured to execute the circulation of the ink for the preset time period in the case where the variable n indicating the number of times of determination exceeds the preset number of times. However, the present disclosure is not limited only to this configuration. Specifically, a time period for circulating the inks may be changed in accordance with the number of times of determination exceeding the preset number of times. Alternatively, if the number of times of determination is determined to exceed the preset number of times, a determination may be further made as to whether or not the number of times of determination has reached a prescribed number of times larger than the preset number of times. Then, the wiping processing may be executed by using the vacuum wiper unit 172 in the case where the determination is made that the number of times of determination has reached the prescribed number of times.

(3) The above-described second embodiment is configured to execute the determination processing for the predetermined number of times in the case where the number of the ejection parts 97 having ejection abnormality becomes equal to or below the first value. However, the present disclosure is not limited only to this configuration. Specifically, the range equal to or below the first value may be divided into multiple stages and the determination processing may be executed for various number of times depending on the divided stages. To be more precise, as shown in FIG. 19, for example, the number of times of determination is set to once in a case where the number "m" of the ejection parts 97 having ejection abnormality satisfies "0≤m<10", the number of times of determination is set to three times in a case where the number "m" satisfies "10≤m<30", and the number of times of determination is set to five times in a case where the number "m" satisfies "30≤m<50". Meanwhile, the above-described second embodiment is configured to execute the circulation of the inks for the predetermined time period in the case where the number of the ejection parts 97 having ejection abnormality becomes larger than the first value and equal to or below the second value. However, the present disclosure is not limited only to this configuration. Specifically, the range above the first value and equal to or below the second value may be divided into multiple stages and the circulation of the inks may be executed for various time periods depending on the divided stages. To be more precise, as shown in FIG. 19, for example, the time period for circulation of the inks is set to 5 seconds in a case where the number "m" of the ejection parts 97 having ejection abnormality satisfies "50≤m<100" and the time period for the circulation of the inks is set to 10 seconds in a case where the number "m" satisfies "100≤m<200". Meanwhile, the time period for circulation of the inks is set to 25 seconds in a case where the number "m" satisfies "200≤m<500" and the time period for the circulation of the inks is set to 50 seconds in a case where the number "m" satisfies "500≤m<1000". In the meantime, the wiping processing is executed by using the vacuum wiper unit 172 in a case where the number "m" satisfies "1000≤m". Note that the values cited above are mere examples and can be modified as appropriate.

(4) Although it is not particularly discussed in the above-described embodiments, the recovery operation may be determined based on the determination information obtained in the course of the determination of the state of ejection of the inks at the ejection parts 97. To be more precise, the circulation of the inks is executed in a case where the determination information is "2". Meanwhile, the wiring processing is executed by using the vacuum wiper unit 172 in a case where the determination information is "3". In the meantime, the determination of the state of ejection or the circulation of the inks is executed in a case where the determination information is "4". Meanwhile, either the circulation of the inks is executed or, though it is not described in the embodiments, various other recovery operations besides the determination of the state of ejection, the circulation of the inks, and the wiping processing may be executed in a case where the determination information is "5". In this case, a combination of two or more of these recovery operations may be executed.

(5) The above-described third embodiment is configured such that the determination is made as to whether or not the state of ejection of the inks in the print head 8 is fine and then either the state of ejection is determined again or the circulation of the inks is carried out based on the result of determination. However, the present disclosure is not limited only to this configuration. Specifically, the recovery operation may be executed on each ejection part 97. To be more precise, the determination is made in S1804 as to whether or not the state of ejection of each of the ejection parts 97 targeted for determination is fine. In the case where the state of ejection of the ejection part 97 is determined to be not fine, the determination is made in S1806 as to whether or not the number of times of determination involving the target ejection part has exceeded the preset number of times. In the case of the determination in S1806 that the number of times of determination has exceeded the preset number of times, the circulation of the inks in the circulation paths inclusive of the targeted ejection part will be started in S1810.

(6) Although it is not particularly discussed in the above-described embodiments, the circulation of the inks and the determination of the state of ejection may be carried out in parallel in the case of the configuration in which the detection accuracy of the residual vibration is not affected by the circulation of the ink at the adjacent ejection part as a consequence of providing the respective circulation paths independently of one another, for example. Alternatively, in the case where the detection accuracy of the residual vibration is not affected by the circulation of the ink at the neighboring ejection part while interposing several ejection parts in between, the circulation of the ink through the circulation path that may possibly cause an adverse effect only needs to be stopped while continuing the circulation of the inks through other circulation paths. Specifically, in this modified example, the circulation of the inks is executed in the adjacent ejection part in such a limited range that does not affect the detection accuracy of the residual vibration at the targeted ejection part.

(7) The above-described first embodiment is configured to execute the wiring processing by using the vacuum wiper unit 172 as the recovery processing based on the determination of the state of ejection of the inks in the print head 8. However, the present disclosure is not limited only to this configuration. Specifically, as for the recovery processing, any one of the determination of the state of ejection of the ejection part 97, the wiping processing by using the blade wiper unit 171, and the circulation of the ink may be executed as the recovery processing. Alternatively, the determination, the circulation, and the wiping processing mentioned above may be executed in combination.

(8) The present disclosure can also be realized in the form of processing to supply a program for implementing one or more of the functions of the above-described embodiments to a system or an apparatus through a network or a storage medium, and then to cause one or more processors in a computer in either the system or the apparatus to read and execute the program. The present disclosure can also be implemented by using a circuit (such as an ASIC) that implements one or more of the aforementioned functions.

(9) Two or more of the above-described embodiments and the various modes explained in the foregoing sections (1) to (8) may be combined as appropriate.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An inkjet printing apparatus comprising:

a printing unit including a plurality of ejection parts, each configured to eject ink by using a piezoelectric element configured to be displaced in response to a change in electric potential;

a circulation unit configured execute a circulating operation to circulate ink in a circulation path inclusive of the printing unit;

a detection unit configured to detect residual vibration generated at an ejection part due to ejection of the ink; and a determination unit configured to determine an ejection state of ejection of the ink at the ejection part based on the residual vibration detected by the detection unit, wherein the detection unit is configured to detect residual vibration at the ejection part when circulation of the ink from the circulating operation is caused to not occur in a vicinity of the ejection part.

2. The inkjet printing apparatus according to claim 1, further comprising a control unit configured to switch execution of the circulation by the circulation unit so that circulation of the ink from the circulating operation is caused to not occur in the vicinity of the ejection part in a case where the determination unit determines the ejection state.

3. The inkjet printing apparatus according to claim 2, wherein the control unit causes the determination unit not to make the ejection state determination in parallel with causing the circulation unit to execute the circulation of the ink.

4. The inkjet printing apparatus according to claim 2, wherein the control unit causes the determination unit and the circulation unit to perform a recovery operation based on an abnormality value indicating a number of the plurality of ejection parts determined to have ejection abnormality.

5. The inkjet printing apparatus according to claim 4, wherein, at a time of activating the inkjet printing apparatus, the control unit causes the determination unit to make the ejection state determination and, based on a result of the ejection state determination, the control unit executes the recovery operation.

6. The inkjet printing apparatus according to claim 4, wherein, in a case where the abnormality value is equal to or below a first value, the control unit causes the determination unit to make the ejection state determination, and wherein, in a case where the abnormality value is equal to or below a second value that is larger than the first value, the control unit causes the circulation unit to execute the circulation of the ink.

7. The inkjet printing apparatus according to claim 6, wherein, in the case where the abnormality value is equal to or below the first value and the control unit is to cause the determination unit to make the ejection state determination a number of times, the number of times the control unit is to cause the determination unit to make the ejection state determination varies depending on a magnitude of the abnormality value.

8. The inkjet printing apparatus according to claim 7, wherein, in a case where the abnormality value exceeds the first value and is equal to or below the second value, a time period during which the control unit causes the circulation unit to execute the ink circulation varies depending on the abnormality value.

9. The inkjet printing apparatus according to claim 2, wherein, in executing a recovery operation, the control unit causes the determination unit and the circulation unit to perform the recovery operation based on a ratio value indicating a ratio of a number of the plurality of ejection parts determined to have ejection abnormality relative to a total number of the plurality of ejection parts.

10. The inkjet printing apparatus according to claim 9, wherein, in a case where the ratio value is equal to or below a first value, the control unit causes the determination unit to make the ejection state determination, and wherein, in a case where the ratio value is equal to or below a second value that is larger than the first value, the control unit causes the circulation unit to execute the circulation of the ink.

11. The inkjet printing apparatus according to claim 10, wherein, in the case where the ratio value is equal to or below the first value and the control unit is to cause the determination unit to make the ejection state determination a number of times, the number of times the control unit is to cause the determination unit to make the ejection state determination varies depending on a magnitude of the ratio value.

12. The inkjet printing apparatus according to claim 11, wherein, in a case where the ratio value exceeds the first value and is equal to or below the second value, a time period during which the control unit causes the circulation unit to execute the ink circulation varies depending on the ratio value.

13. The inkjet printing apparatus according to claim 2, wherein, in executing a recovery operation, the control unit executes the recovery operation based on a number of times the inkjet printing apparatus determines a printing state of ink ejection in the printing unit based on the determined ejection state, wherein, in a case where the number of times the printing state determination does not exceed a preset number of times, the inkjet printing apparatus determines the printing state of ejection of the printing unit by causing the determination unit to make the ejection state determination, and wherein, in a case where the number of times the printing state determination exceeds the preset number of times, the inkjet printing apparatus causes the circulation unit to execute the ink circulation.

14. The inkjet printing apparatus according to claim 13, wherein a time period during which the inkjet printing apparatus causes the circulation unit to execute the ink circulation varies depending on the number of times the printing state determination exceeds the preset number of times.

15. The inkjet printing apparatus according to claim 13, wherein, in executing the ink circulation, a time period during which the inkjet printing apparatus causes the circulation unit to execute the ink circulation varies depending on the number of times the ejection state determination exceeds the preset number of times.

16. The inkjet printing apparatus according to claim 2, wherein, in executing a recovery operation, the control unit executes the recovery operation based on a number of times the determination unit determines the ejection state of the ejection of the ink at the ejection part based on the detected residual vibration, wherein, in a case where the number of times the ejection state determination does not exceed a preset number of times, the inkjet printing apparatus causes the determination unit to make the printing state determination at an ejection part targeted for the printing state determination, and wherein, in a case where the number of times the ejection state determination exceeds the preset number of times, the inkjet printing apparatus causes the circulation unit to execute the circulation of the ink in the circulation path inclusive of the targeted ejection part.

17. The inkjet printing apparatus according to claim 2, wherein, in a case where the control unit causes the determination unit to make the ejection state determination, the control unit causes the circulation unit to execute ink circulation in the circulation path inclusive of the printing unit in a limited manner so as not to affect detection accuracy of the residual vibration generated at an ejection part targeted for the ejection state determination.

18. The inkjet printing apparatus according to claim 2, wherein, in a case where a timing at which the control unit is to cause the determination unit to make the ejection state determination comes during causing the circulation unit to execute the circulation of the ink, the control unit causes the circulation unit to stop the ink circulation and causes the determination unit to determine the ejection state of ejection of the ink at the ejection part based on the detected residual vibration after a lapse of a predetermined time period.

19. A method for an inkjet printing apparatus having a printing unit including a plurality of ejection parts, each configured to eject ink by using a piezoelectric element configured to be displaced in response to a change in electric potential, the method comprising:

executing a circulating operation to circulate ink in a circulation path inclusive of the printing unit;

detecting residual vibration generated at an ejection part due to ejection of the ink; and determining an ejection state of ejection of the ink at the ejection part based on the detected residual vibration, wherein detecting includes detecting residual vibration at the ejection part when circulation of the ink from the circulating operation is caused to not occur in a vicinity of the ejection part.

20. The method according to claim 19, further comprising switching execution of the circulation so that circulation of the ink from the circulating operation is caused to not occur in the vicinity of the ejection part in a case where the ejection state is determined.

21. The method according to claim 19, further comprising causing the ejection state determination not to be made in parallel with causing the circulation of the ink to be executed.

22. A non-transitory computer-readable storage medium storing a program to cause a computer to perform a method for an inkjet printing apparatus having a printing unit including a plurality of ejection parts, each configured to eject ink by using a piezoelectric element configured to be displaced in response to a change in electric potential, the method comprising:

executing a circulating operation to circulate ink in a circulation path inclusive of the printing unit;

detecting residual vibration generated at an ejection part due to ejection of the ink; and determining an ejection state of ejection of the ink at the ejection part based on the detected residual vibration, wherein detecting includes detecting residual vibration at the ejection part when circulation of the ink from the circulating operation is caused to not occur in a vicinity of the ejection part.

23. The inkjet printing apparatus according to claim 1, wherein the vicinity of the ejection part is in a vicinity of an ejection opening of the ejection part.

24. The inkjet printing apparatus according to claim 1, wherein the vicinity of the ejection part is at a location where circulation of the ink from the circulating operation presents a likelihood of causing a variation in accuracy of the detection of the residual vibration by the detection unit.

25. The inkjet printing apparatus according to claim 1, wherein the vicinity of the ejection part is at a location where circulation of the ink from the circulating operation at that location presents a likelihood of causing a variation in accuracy of the determination of the ejection state of the ejection part by the determination unit.

26. The inkjet printing apparatus according to claim 1, wherein the circulation of the ink from the circulating operation is caused to not occur in a vicinity of the ejection part after a print operation by the printing unit to print on a print medium begins and before the print operation ends.

27. The inkjet printing apparatus according to claim 1, wherein the detection unit is configured to detect residual vibration at the ejection part when circulation of the ink from the circulating operation occurs in a vicinity of a second ejection part that is adjacent to the ejection part.

28. The inkjet printing apparatus according to claim 1, wherein the ejection part comprises printing elements having the piezoelectric element, an ejection opening configured to eject ink, a vibration plate configured to vibrate with vibration of the printing element, and a pressure chamber disposed between the ejection opening and the vibration plate and configured to be filled with ink, wherein the residual vibration is vibration that remains at the ejection part after completion of each ink ejection from the ejection part, wherein, in determining the ejection state at the ejection part, the determination unit determines whether a measured aspect of the ink ejected by the ejection part and determined from the detected residual vibration is in accordance with a predetermined aspect of the ink defined by a driving signal Vin supplied to the piezoelectric element of the ejection part based on image data, and wherein the predetermined aspect of the ink is at least one of a predetermined amount of ink to be ejected or a predetermined speed at which the ink is to be ejected.

* * * * *